US010631274B2

(12) United States Patent
Sun

(10) Patent No.: US 10,631,274 B2
(45) Date of Patent: Apr. 21, 2020

(54) APPARATUS AND METHOD FOR MANAGING WIRELESS TRANSMISSION RESOURCES

(71) Applicant: SONY CORPORATION, Tokyo (JP)

(72) Inventor: Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 55 days.

(21) Appl. No.: 14/422,533

(22) PCT Filed: Jul. 11, 2013

(86) PCT No.: PCT/CN2013/079218
§ 371 (c)(1),
(2) Date: Feb. 19, 2015

(87) PCT Pub. No.: WO2014/036856
PCT Pub. Date: Mar. 13, 2014

(65) Prior Publication Data
US 2015/0237609 A1    Aug. 20, 2015

(30) Foreign Application Priority Data

Sep. 7, 2012   (CN) .......................... 2012 1 0330823

(51) Int. Cl.
*H04W 72/04*        (2009.01)
*H04W 72/08*        (2009.01)
(Continued)

(52) U.S. Cl.
CPC ...... *H04W 72/0406* (2013.01); *H04B 17/345* (2015.01); *H04W 16/14* (2013.01);
(Continued)

(58) Field of Classification Search
CPC ... H04W 16/14; H04W 24/02; H04W 52/243; H04W 52/42; H04W 72/04;
(Continued)

(56) References Cited

U.S. PATENT DOCUMENTS

| 6,591,382 B1* | 7/2003 | Molloy | ................ H04L 1/0009 714/704 |
| 2004/0042428 A1* | 3/2004 | Hamalainen | ......... H04B 7/0602 370/335 |

(Continued)

FOREIGN PATENT DOCUMENTS

| CN | 101527915 A | 9/2009 |
| CN | 102238549 A | 11/2011 |

(Continued)

OTHER PUBLICATIONS

International Search Report dated Oct. 17, 2013 in PCT/CN2013/079218 filed Jul. 11, 2013.

(Continued)

*Primary Examiner* — Michael Thier
*Assistant Examiner* — Prince A Mensah
(74) *Attorney, Agent, or Firm* — Xsensus LLP

(57) ABSTRACT

A spectrum management system includes circuitry that obtains information of a primary communication system, where the information includes an interference tolerance of the primary communication system. The circuitry also obtains a desired communication quality for a secondary communication system, and determines available resources for the secondary communication system that result in an interference level below the interference tolerance of the primary communication system. The circuitry then allocates resources to the secondary communication system based on a comparison of an estimated communication quality of the secondary communication system if the available resources are used and the desired communication quality.

26 Claims, 14 Drawing Sheets

(51) Int. Cl.
*H04W 52/24* (2009.01)
*H04B 17/345* (2015.01)
*H04W 16/14* (2009.01)
*H04W 36/30* (2009.01)
*H04W 36/38* (2009.01)

(52) U.S. Cl.
CPC ........... *H04W 36/30* (2013.01); *H04W 36/38* (2013.01); *H04W 52/243* (2013.01); *H04W 52/244* (2013.01); *H04W 72/046* (2013.01); *H04W 72/0446* (2013.01); *H04W 72/0453* (2013.01); *H04W 72/0473* (2013.01); *H04W 72/082* (2013.01); *H04W 72/085* (2013.01)

(58) Field of Classification Search
CPC ............. H04W 72/082; H04W 72/085; H04W 17/345; H04W 36/30; H04W 36/38; H04W 52/244; H04W 72/0406; H04W 72/0446; H04W 72/0453; H04W 72/046; H04W 72/0473
See application file for complete search history.

(56) References Cited

U.S. PATENT DOCUMENTS

| | | | | |
|---|---|---|---|---|
| 2007/0287464 | A1* | 12/2007 | Hamamoto | H04L 5/06 455/447 |
| 2008/0171553 | A1* | 7/2008 | Ren | H04W 72/02 455/450 |
| 2010/0330919 | A1* | 12/2010 | Gurney | H04W 52/367 455/67.11 |
| 2011/0022714 | A1* | 1/2011 | Nobukiyo | H04J 11/0093 709/226 |
| 2011/0039495 | A1* | 2/2011 | Sawai | H04W 52/16 455/62 |
| 2011/0051673 | A1* | 3/2011 | Roberts | H04L 5/006 370/329 |
| 2012/0140661 | A1* | 6/2012 | Ohseki | H04L 1/0019 370/252 |
| 2012/0281602 | A1* | 11/2012 | Tsunekawa | H04W 36/30 370/280 |
| 2012/0282962 | A1* | 11/2012 | Madon | H04W 16/04 455/509 |
| 2012/0287881 | A1* | 11/2012 | Arnott | H04L 5/0039 370/329 |
| 2012/0320770 | A1* | 12/2012 | Jen | H04W 72/085 370/252 |
| 2013/0003583 | A1* | 1/2013 | Landstrom | H04B 7/0452 370/252 |
| 2013/0029706 | A1* | 1/2013 | Sachs | H04W 16/14 455/501 |
| 2013/0039325 | A1 | 2/2013 | Guo | |
| 2013/0090141 | A1* | 4/2013 | Hottinen | H04W 72/1231 455/501 |
| 2013/0102319 | A1* | 4/2013 | Yamazaki | H04W 52/243 455/450 |
| 2013/0163540 | A1* | 6/2013 | Roh | H04W 72/085 370/329 |
| 2013/0178221 | A1* | 7/2013 | Jung | H04L 9/0844 455/450 |

FOREIGN PATENT DOCUMENTS

| | | |
|---|---|---|
| JP | 2012-151815 A | 8/2012 |
| WO | 00/51390 A1 | 8/2000 |
| WO | 2011/158502 A1 | 12/2011 |

OTHER PUBLICATIONS

Notice of Preliminary Rejection received in Korean Application 10-2017-7015042 dated Oct. 8, 2018.

* cited by examiner

APPARATUS AND METHOD FOR MANAGING WIRELESS TRANSMISSION RESOURCES

FIELD OF THE INVENTION

The present invention relates to the field of wireless communications and particularly to a wireless communication system in which a primary system and a secondary system coexist and a method and apparatus for managing wireless transmission resources in the wireless communication system.

BACKGROUND OF THE INVENTION

Users have increasingly higher service demands for high-quality and high-speed new services along with the evolvement of wireless communication systems. Wireless communication operators and device manufacturers have to improve the systems constantly to satisfy the demands of the users. This requires a large number of transmission resources (the transmission resource can be spectrum resources, e.g., carriers, sub-carriers, etc., or time-frequency resources, e.g., timeslots and can be quantified by a parameter, e.g., time, a frequency, a bandwidth and/or allowable maximum emission power or the like) to support the new services and to satisfy the demand for high-speed communication. Limited transmission resources typically have been allocated to a fixed operator and service. New available transmission resources (e.g., spectrum resources) are very scarce or prohibitively expensive. In view of this circumstance, the concept of dynamic spectrum utilization has been proposed, that is, dynamical utilization of those spectrum resources which have been allocated to some service but underused. Such an application scenario typically includes a Primary System (PS) and a Secondary System (SS). The primary system as mentioned here can refer to those systems to which a spectrum is accessible, e.g., television and radio systems or mobile communication systems with spectrum resources or the like allocated thereto; and the secondary system refers to a system without an accessible spectrum, which can access the spectrum accessible to the primary system as appropriate only if the spectrum is not in use by the primary system. Moreover both the primary system and the secondary system as mentioned here can be systems to which a spectrum is accessible but with different access priorities to the spectrum. For example, an existing base station and available service can have a spectrum access priority when an operator deploys a new base station for provision of a new service. A base station of the primary system is referred to as a Primary Base Station (PBS), and a user of the primary system is referred to as a Primary User (PU). A base station of the secondary system is referred to as a Secondary Base Station (SBS). A user in the secondary system is referred to as a Secondary User (SU). For example, in the case that the primary system is a digital television or radio system, the secondary system can utilize dynamically a spectrum of a channel, over which no program is broadcast, among digital television or radio spectrums, or a spectrum of an adjacent channel thereof for wireless mobile communication without interfering reception of a television signal.

SUMMARY OF THE INVENTION

Exemplary embodiments of this disclosure provide an apparatus and method for managing wireless transmission resources, which can allocate effectively a transmission resource to a secondary system in a wireless communication application scenario in which a primary system and the secondary system coexist.

This summary of this disclosure is given below so as to provide basic understanding of some aspects of this disclosure. It shall be appreciated that this summary is not an exhaustive overview of this disclosure. It is neither intended to identify key or important components of this disclosure nor intended to limit the scope of this disclosure. Its sole purpose is to present some concepts in a simplified form as a preamble of the following detailed description.

According to an exemplary aspect of the disclosure, a spectrum management system includes circuitry that obtains information of a primary communication system, where the information includes an interference tolerance of the primary communication system. The circuitry also obtains a desired communication quality for a secondary communication system, and determines available resources for the secondary communication system that result in an interference level below the interference tolerance of the primary communication system. The circuitry then allocates resources to the secondary communication system based on a comparison of an estimated communication quality of the secondary communication system if the available resources are used and the desired communication quality.

According to another exemplary aspect of the disclosure, a spectrum management method includes obtaining, with circuitry, information of a primary communication system, where the information includes an interference tolerance of the primary communication system. The method also includes obtaining, with the circuitry, a desired communication quality for a secondary communication system, and determining, with the circuitry, available resources for the secondary communication system that result in an interference level below the interference tolerance of the primary communication system. After this, the method allocates, with the circuitry, resources to the secondary communication system based on a comparison of an estimated communication quality of the secondary communication system if the available resources are used and the desired communication quality.

According to a further exemplary aspect of the disclosure, non-transitory computer-readable medium is encoded with computer-readable instructions thereon. The computer-readable instructions, when executed by a computer, cause the computer to perform a method that includes obtaining information of a primary communication system, where the information including an interference tolerance of the primary communication system. The method also includes obtaining a desired communication quality for a secondary communication system and determining available resources for the secondary communication system that result in an interference level below the interference tolerance of the primary communication system. Then the method allocates resources to the secondary communication system based on a comparison of an estimated communication quality of the secondary communication system if the available resources are used and the desired communication quality.

According to another exemplary aspect of this disclosure, there is provided an apparatus for managing wireless transmission resources, which is applicable to a wireless communication scenario including a primary system and a secondary system. The apparatus includes: an information obtaining device configured to obtain resource information of the primary system and resource information of the secondary system, wherein the resource information of the primary system includes information of an interference tolerance threshold reflecting a maximum interference power level tolerable to the primary system; a critical region estimating device configured to estimate a critical region of the primary system according to the resource information of the primary system and the resource information of the secondary system, wherein the critical region of the primary system includes such a region in a coverage area of the primary system that has a low signal to noise ratio due to interference of the secondary system; and a resource allocating device configured to determine an available transmission resource available to the secondary system among transmission resources of the primary system according to the critical region of the primary system and the interference tolerance threshold. In a particular embodiment, the resource information of the primary system can further include information on emission power of a primary base station in the primary system, the coverage area of the primary base station and a channel model of the primary system. The resource information of the secondary system can include information on emission power of a secondary base station in the secondary system, a channel model of the secondary system, and a coverage area and location of the secondary base station.

According to yet another exemplary aspect of this disclosure, there is provided an apparatus for managing wireless transmission resources, wherein the apparatus is applicable to a wireless communication scenario comprising a primary system and a secondary system and comprises: an information obtaining device configured to obtain information on a desired communication quality of the secondary system; and a resource allocating device configured to allocate the transmission resources of the primary system to the secondary system according to the desired communication quality. Optionally, the resource allocating device is configured to estimate a communication quality of a secondary user in the secondary system over a transmission resource in the primary system, to judge whether the estimated communication quality satisfies the desired communication quality, and allocate the transmission resource of the primary system to the secondary system according to the judging result. Optionally, if the estimated communication quality satisfies the desired communication quality, the resource allocating device allocates the transmission resource of the primary system to the secondary system. Optionally, the resource allocating device is further configured to lower the transmission resource allocated to the secondary system or emission power of the secondary system over the transmission resource when the estimated communication quality is above the desired communication quality. Optionally, the resource allocating device allocates only part of the transmission resources that satisfies the desired communication quality of the secondary system to the secondary system. Optionally, if the estimated communication quality is lower than the desired communication quality, the resource allocating device is configured to not to allocate the transmission resource to the secondary system. Optionally, if the estimated communication quality is lower than the desired communication quality, the resource allocating device is configured to send an instruction to the secondary system. Optionally, the instruction includes information of reconfiguration of the secondary system. Optionally, the apparatus for managing wireless transmission resources further comprises transmitting device configured to transmit information related to allocation of transmission resources to the secondary system.

According to further exemplary aspects of this disclosure, there is provided a secondary system apparatus, configured to provide information related to a desired communication quality to the apparatus for managing wireless transmission resources and receive information related to allocation of transmission resources from the apparatus for managing wireless transmission resources. Optionally, the information related to transmission resource allocation is determined according to whether an estimated communication quality of the transmission resource of primary system if used by the secondary system can satisfy the desired communication quality. Optionally, when the estimated communication quality satisfies the desired communication quality, the information related to transmission resource allocation comprises transmission resource of the primary system allocated to the secondary system apparatus. Optionally, when the estimated communication quality is higher than the desired communication quality, transmission resource of the primary system allocated to the secondary system apparatus is only part of the transmission resources that satisfies the desired communication quality of the secondary system apparatus. Optionally, if the estimated communication quality is lower than the desired communication quality, the information related to transmission resource allocation comprises an instruction to the secondary system apparatus. Optionally, the instruction includes information of reconfiguration of the secondary system apparatus.

According to still further exemplary aspects of this disclosure, there is provided a managing method of secondary system apparatus, comprising: providing information related to a desired communication quality to the apparatus for managing wireless transmission resources; and receiving information related to allocation of transmission resources from the apparatus for managing wireless transmission resources. Optionally, the information related to transmission resource allocation is determined according to whether an estimated communication quality of the transmission resource of primary system if used by the secondary system can satisfy the desired communication quality. Optionally, when the estimated communication quality satisfies the desired communication quality, the information related to transmission resource allocation comprises transmission resource of the primary system allocated to the secondary system apparatus. Optionally, when the estimated communication quality is higher than the desired communication quality, transmission resource of the primary system allocated to the secondary system apparatus is only part of the transmission resources that satisfies the desired communication quality of the secondary system apparatus. Optionally, if the estimated communication quality is lower than the desired communication quality, the information related to transmission resource allocation comprises an instruction to the secondary system apparatus. Optionally, the instruction includes information of reconfiguration of the secondary system apparatus.

According to further exemplary aspects of this disclosure, there is provided a method for managing wireless transmission resources, which is applicable to a wireless communication scenario including a primary system and a secondary system. The method includes: obtaining resource information of the primary system and resource information of the secondary system, wherein the resource information of the primary system includes information of an interference tolerance threshold reflecting a maximum interference power level tolerable to the primary system; estimating a critical region of the primary system according to the resource information of the primary system and the resource information of the secondary system, wherein the critical region of the primary system includes such a region in a coverage area of the primary system that has a low signal to noise ratio due to interference of the secondary system; and determining an available transmission resource available to the secondary system among transmission resources of the primary system according to the critical region of the primary system and the interference tolerance threshold. In a particular embodiment, the resource information of the primary system can further include information on emission power of a primary base station in the primary system, the coverage area of the primary base station and a channel model of the primary system. The resource information of the secondary system can include information on emission power of a secondary base station in the secondary system, a channel model of the secondary system, and a coverage area and location of the secondary base station.

Optionally determining an available transmission resource available to the secondary system among transmission resources of the primary system can further include: estimating interference caused by the secondary system during communicating over the transmission resources to the primary system in the critical region of the primary system; and determining a transmission resource with an interference value which is not above the interference tolerance threshold of the primary system as the available transmission resource available to the secondary system.

Optionally the method for managing wireless transmission resources can further include: obtaining information on a desired communication quality of the secondary system; estimating a critical region of the secondary system according to the resource information of the primary system and the resource information of the secondary system, wherein the critical region of the secondary system includes such a region in a coverage area of the secondary system that has a low signal to noise ratio due to interference of the primary system; assessing an optimum communication quality achievable to the secondary system over the available transmission resource in the critical region of the secondary system; judging whether a result of the assessing satisfies the desired communication quality of the secondary system, and if not so, not to allocate the available transmission resource to the secondary system. In a preferred embodiment, if the result of the assessing is judged to be above the desired communication quality of the secondary system, then the transmission resource allocated to the secondary system or emission power of the secondary system over the transmission resource can be lowered. In another preferred embodiment, the secondary system can be further instructed to be reconfigured upon judging the result of the assessing not to satisfy the desired communication quality of the secondary system.

Optionally the method for managing wireless transmission resources can further include: monitoring a communication quality of a primary user in the critical region of the primary system (and optionally a surrounding region thereof) and a communication quality of a secondary user in the critical region of the secondary system (and optionally a surrounding region thereof); and updating the resource information of the primary system and/or the resource information of the secondary system according to a result of the monitoring.

Optionally the method for managing wireless transmission resources can further include: receiving a handover request of the primary user in the primary system who is located in the critical region of the primary system for a handover to the secondary system when the communication quality of the primary user in the critical region of the primary system is below a predetermined communication quality threshold.

Optionally the method for managing wireless transmission resources can further include: sending to the primary system a handover request of the secondary user in the secondary system who is located in the critical region of the secondary system for a handover to the primary system when the communication quality of the secondary user in the critical region of the secondary system is below a predetermined communication quality threshold.

Optionally the method for managing wireless transmission resources can further include: optimizing an antenna beam shape of a secondary base station according to the result of the monitoring.

Optionally the method for managing wireless transmission resources can further include: obtaining communication qualities of a primary user in the critical region of the primary system and communication qualities of a secondary user in the critical region of the secondary system under different antenna beam shapes of a secondary base station; and selecting an antenna beam shape of the secondary base station according to the communication qualities in these two critical regions. Optionally selecting an antenna beam shape of the secondary base station can include: calculating the sums and/or the products of the communication qualities in the critical region of the primary system and the communication qualities in the critical region of the secondary system under the different antenna beam shapes of the secondary base station; and selecting the antenna beam shape corresponding to the highest value of the sum or the product as the antenna beam shape of the secondary base station.

Optionally the method for managing wireless transmission resources can further include: obtaining communication qualities in the critical region of the secondary system under different antenna beam shapes of a secondary base station; and selecting the antenna beam shape corresponding to the optimum communication quality as the antenna beam shape of the secondary base station.

Optionally estimating the critical region of the secondary system can include: calculating a transmission path gain of a primary base station to a location in the coverage area of the secondary system according to a channel model of the primary system; calculating a transmission path gain of a secondary base station to the location according to a channel model of the secondary system; estimating a signal to noise ratio of the location according to these two transmission paths gains; and determining the critical region of the secondary system according to the signal to noise ratios at the respective locations in the coverage area of the secondary system. Alternatively estimating the critical region of the secondary system can include: obtaining an instantaneous path fading gain of a primary base station to a location in the coverage area of the secondary system and an instantaneous path fading gain of a secondary base station to the location in the coverage area of the secondary system; estimating an outage rate at the location according to these two instantaneous path fading gains; and determining the critical region of the secondary system according to the outage rates at the respective locations in the coverage area of the secondary system. Alternatively estimating the critical region of the secondary system can include: calculating an instantaneous channel capacity at a location subject to interference of the primary system in the coverage area of the secondary system according to emission power of a secondary base station; estimating an outage channel capacity at the location according to the instantaneous channel capacity; and determining the critical region of the secondary system according to the outage channel capacities at the respective locations in the coverage area of the secondary system.

Optionally estimating the critical region of the primary system can include: calculating a transmission path gain of a primary base station to a location in the coverage area of the primary system according to a channel model of the primary system; calculating a transmission path gain of a secondary base station to the location in the coverage area of the primary system according to a channel model of the secondary system; estimating a signal to noise ratio of the location according to these two transmission paths gains; and determining the critical region of the primary system according to the signal to noise ratios at the respective locations in the coverage area of the primary system. Alternatively estimating the critical region of the primary system can include: obtaining an instantaneous path fading gain of a primary base station to a location in the coverage area of the primary system and an instantaneous path fading gain of a secondary base station to the location in the coverage area of the primary system; estimating an outage rate at the location according to these two instantaneous path fading gains; and determining the critical region of the primary system according to the outage rates at the respective locations in the coverage area of the primary system. Alternatively estimating the critical region of the primary system can include: calculating an instantaneous channel capacity at a location subject to interference of the secondary system in the coverage area of the primary system according to emission power of a primary base station; estimating an outage channel capacity at the location according to the instantaneous channel capacity; and determining the critical region of the primary system according to the outage channel capacities at the respective locations in the coverage area of the primary system.

Optionally the secondary systems can be clustered into a plurality of secondary system clusters. Particularly determining an available transmission resource available to the secondary system can include: determining an available transmission resource available to each secondary system cluster among the transmission resources of the primary system. Optionally the method for managing wireless transmission resources can further include: re-clustering the secondary systems according to a change in system information According to another exemplary aspect of this disclosure, there is provided a method for managing wireless transmission resources, wherein the method is applicable to a wireless communication scenario comprising a primary system and a secondary system and comprises: obtaining information on a desired communication quality of the secondary system; and allocating the transmission resources of the primary system to the secondary system according to the desired communication quality.

Optionally the method further comprises estimating a communication quality of a secondary user in the secondary system over a transmission resource in the primary system; and judging whether the estimated communication quality satisfies the desired communication quality, and allocating the transmission resource of the primary system to the secondary system according to the judging result, wherein if the estimated communication quality satisfies the desired communication quality, allocating the transmission resource of the primary system to the secondary system.

Optionally the transmission resource allocated to the secondary system or emission power of the secondary system over the transmission resource is lowered when the estimated communication quality is above the desired communication quality, wherein only part of the transmission resources that satisfies the desired communication quality of the secondary system is allocated to the secondary system.

Optionally the method further comprises if the estimated communication quality is lower than the desired communication quality, not allocating the transmission resource to the secondary system.

Optionally the method further comprises if the estimated communication quality is lower than the desired communication quality, sending an instruction to the secondary system, wherein the instruction includes information of reconfiguration of the secondary system.

Optionally the method further comprises transmitting information related to allocation of transmission resources to the secondary system.

According to a further exemplary aspect of this disclosure, there is provided a communication system including the apparatus for managing wireless transmission resources described above.

Moreover this disclosure further provides a computer program for performing the method described above.

Furthermore this disclosure also provides at least a computer program product in the form of a computer readable medium on which computer program codes for performing the method described above are recorded.

BRIEF DESCRIPTION OF THE DRAWINGS

The foregoing and other objects, features and advantages of this disclosure will become more apparent from the following description of embodiments of this disclosure with reference to the drawings in which components are not drawn to scale but only intended to illustrate the principle of this disclosure and in which identical or like technical features or components will be denoted by identical or like reference numerals.

DETAILED DESCRIPTION OF THE INVENTION

Figure 1:
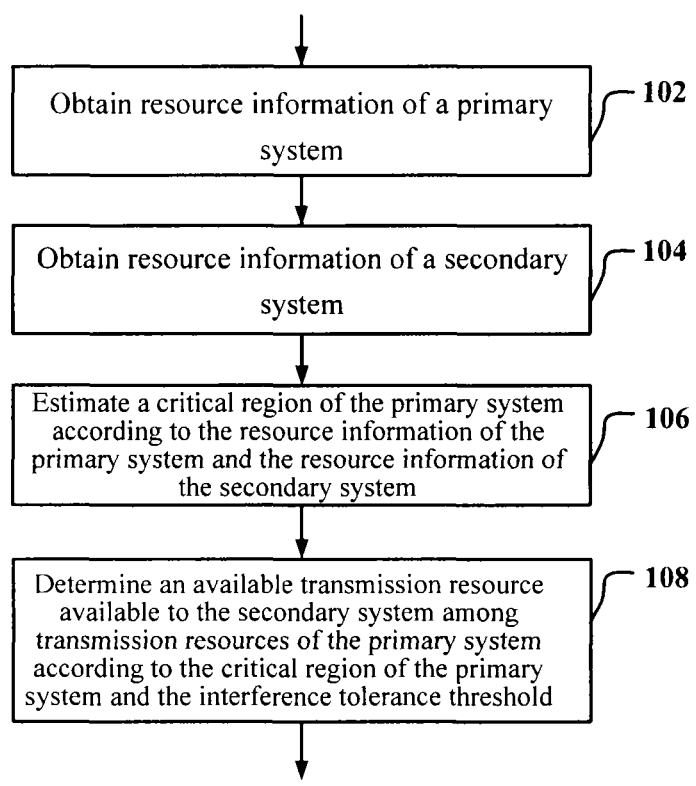
FIG. 1 is a schematic flow chart illustrating a method for managing wireless transmission resources according to an embodiment of this disclosure.

Embodiments of this disclosure will be described below with reference to the drawings. An element and a feature described in a drawing or an embodiment of this disclosure can be combined with an element and a feature illustrated in one or more other drawings or embodiments. It shall be noted that a representation and a description of components and processes irrelevant to this disclosure as well known to those ordinarily skilled in the art have been omitted in the drawings and the description for the sake of clarity.

Some embodiments of this disclosure provide an apparatus and method for allocating a wireless transmission resource to a secondary system in a wireless communication application scenario in which a primary system and the secondary system coexist. One or more secondary systems can be included in the wireless communication application scenario. The secondary system(s) share wireless transmission resources of the primary system.

The wireless transmission resources as mentioned here can be any time-frequency resources over which information is transmitted in the communication system, e.g., carriers, sub-carriers, timeslots, etc. For example, the transmission resources can be sub-carriers in an Orthogonal Frequency Division Multi-Access (OFDMA) system. In another example, the transmission resources can be timeslots in a Time Division Multi-Access (TDMA) system. Moreover the communication system as mentioned in this disclosure will not be limited to the OFDMA or TDMA system described above but can be others type of communication systems which will not be enumerated here.

Moreover the primary system as mentioned here can be any wireless communication system to which wireless transmission resources have been allocated, e.g., a television or radio system or an existing wireless communication system of a wireless operator or the like, which will not be enumerated here.

FIG. 1 is a schematic flow chart illustrating a method for allocating a wireless transmission resource according to an embodiment of this disclosure. The method for allocating a wireless transmission resource illustrated in FIG. 1 can be performed by an apparatus for allocating a wireless transmission resource in a secondary system (e.g., a spectrum manager associated with the secondary system, a secondary base station in the secondary system, etc.).

As illustrated in FIG. 1, the method for allocating a wireless transmission resource can include steps 102, 104, 106 and 108.

In the step 102, resource information of a primary system is obtained. The resource information of the primary system as mentioned here includes information of an interference tolerance threshold reflecting a maximum interference power level tolerable to the primary system. In a particular embodiment, the resource information of the primary system can further include other information on resource utilization of the primary system, for example, it can further include information on emission power of a primary base station in the primary system, a coverage area of the primary base station and a channel model of the primary system.

The resource information of the primary system can be obtained, by an apparatus for allocating a wireless transmission resource in a secondary system, from a primary base station of the primary system. Alternatively the information can be pre-stored in the apparatus for allocating a wireless transmission resource of the secondary system (e.g., stored in a memory device therein (not illustrated)) and retrieved as needed for use. A detailed description thereof will be omitted here.

In the step 104, resource information of a secondary system is obtained. The resource information of the secondary system as mentioned here can include information about resource utilization of the secondary system. For example, the information can include information on emission power of a secondary base station in the secondary system, a channel model of the secondary system, a coverage area and a location of the secondary base station, etc.

The resource information of the secondary system can be obtained, by the apparatus for allocating a wireless transmission resource in the secondary system, from a secondary base station and/or a secondary user of the secondary system. Alternatively the information can be pre-stored in the apparatus for allocating a wireless transmission resource of the secondary system (e.g., stored in the memory device therein (not illustrated)) and retrieved as needed for use. A detailed description thereof will be omitted here.

Then in the step 106, a critical region possibly existing in a coverage area of the primary system (also referred to a critical region of the primary system) is estimated according to the resource information of the primary system and the resource information of the secondary system. The critical region of the primary system as mentioned here can include one or more regions with a lower communication quality (i.e., with a lower signal to noise ratio due to interference of the secondary system) in the coverage area of the primary system, for example, a region with a signal to noise ratio below a predetermined threshold (the threshold can be determined by a practical demand in a practical application and will not be limited here to a particular value).

Signal to noise ratios in respective regions in the coverage area of the primary system can be estimated from the resource information of the primary system and the resource information of the secondary system in any appropriate method to thereby determine the critical region of the primary system, for example, in any one of examples of methods described below with reference to FIG. 8, FIG. 10 and FIG. 12. Of course this disclosure will not be limited to these embodiments or examples.

Then in the step 108, an available transmission resource available to the secondary system among transmission resources of the primary system is determined according to the critical region of the primary system and the interference tolerance threshold of a primary base station.

The determined available transmission resource can include a wireless transmission resource (an available timeslot, an available frequency band and/or a maximum transmission bandwidth and emission power therein or the like) available to the secondary system.

The available transmission resource can be determined according to the critical region of the primary system and the interference tolerance threshold under such a criterion that interference caused by the secondary system during communicating over the available transmission resource to the primary system in the critical region of the primary system shall not exceed the interference tolerance threshold of the primary system. In a particular embodiment, in the process of the step 108, interference caused by the secondary system during communicating over the transmission resources to the primary system in the critical region of the primary system is estimated, and a transmission resource with an interference value which is not above the interference tolerance threshold of the primary system is determined as the available transmission resource available to the secondary system. Those skilled in the art can appreciate that interference caused by the secondary system during communicating over a transmission resource to the primary system in the critical region of the primary system can be estimated in any appropriate method, and this disclosure will be not limited here in this respect, and a detailed description thereof will be omitted here.

In the method for managing wireless transmission resources described above, the critical region in the coverage area of the primary system is estimated, and the available transmission resource available to the secondary system is determined using the critical region. Thus the transmission resource that can be allocated to the secondary system can be determined effectively while ensuring normal operation of the primary system.

Though the above method describes allocating resources to a secondary system based on the critical region of a primary system, one of ordinary skill in the art would recognize that allocation of resources to a secondary system based on a critical region of another secondary system using the above method is also possible without departing from the scope of the present disclosure.

Figure 2:
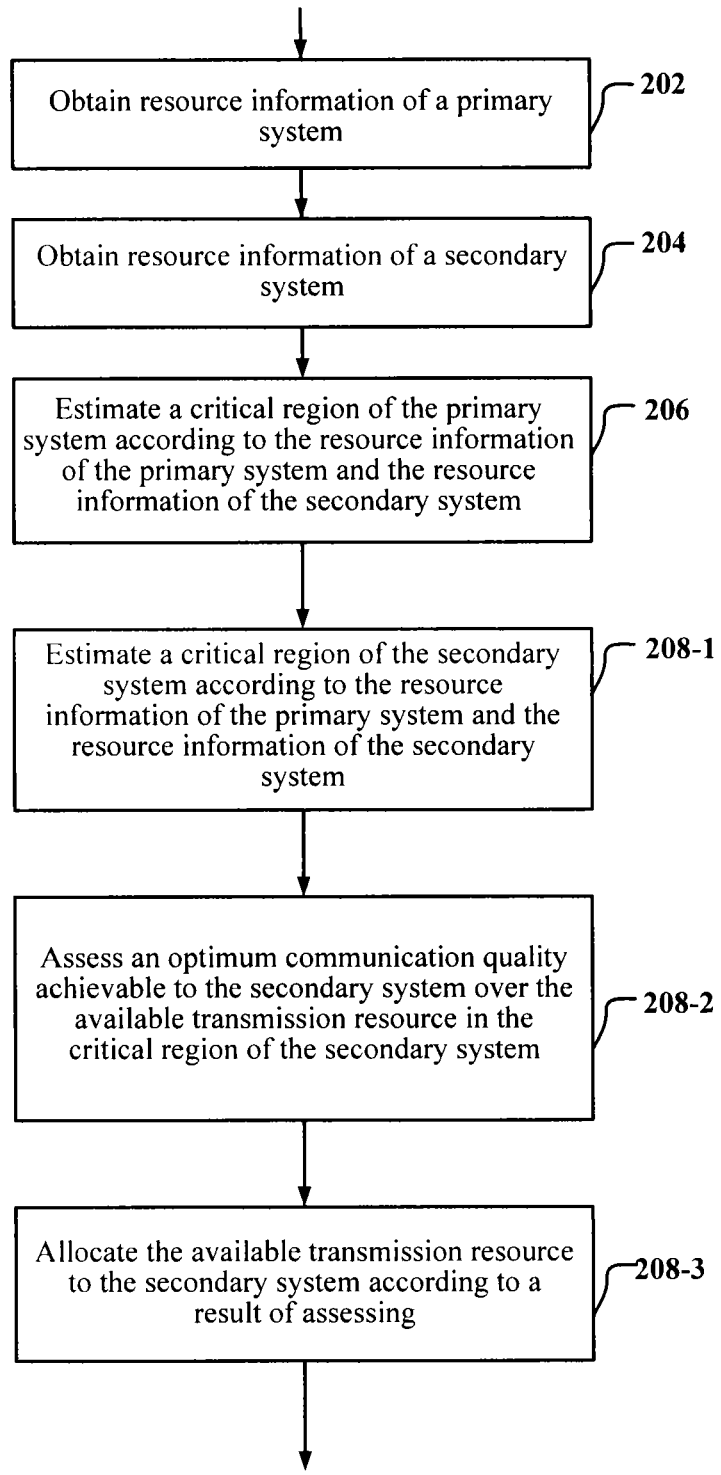
FIG. 2 is a schematic flow chart illustrating a method for managing wireless transmission resources according to another embodiment of this disclosure.

FIG. 2 is a schematic flow chart illustrating a method for managing wireless transmission resources according to another embodiment of this disclosure. A critical region of a secondary system is further estimated in the embodiment illustrated in FIG. 2.

As illustrated in FIG. 2, the method for managing wireless transmission resources includes steps 202, 204, 206, 208-1, 208-2 and 208-3.

The steps 202, 204 and 206 can be similar respectively to the steps 102, 104 and 106 described above, and a repeated description thereof will be omitted here.

In the step 208-1, a critical region possibly existing in a coverage area of the secondary system (also referred to a critical region of the secondary system) is estimated according to the resource information of the primary system and the resource information of the secondary system. The critical region of the secondary system as mentioned here can include one or more regions with a lower communication quality (i.e., with a lower signal to noise ratio due to interference of the primary system) in the coverage area of the secondary system, for example, a region with a signal to noise ratio below a predetermined threshold (the threshold can be determined by a practical demand in a practical application and will not be limited here to a particular value).

Signal to noise ratios in respective regions in the coverage area of the secondary system can be estimated from the resource information of the primary system and the resource information of the secondary system in any appropriate method to thereby determine the critical region of the secondary system, for example, in any one of examples of methods described below with reference to FIG. 9, FIG. 11 and FIG. 13. Of course this disclosure will not be limited to these embodiments or examples.

Then in the step 208-2, an optimum communication quality available to the secondary system over the available transmission resource in the critical region of the secondary system is assessed.

Similarly to the foregoing description, a signal to noise ratio can be taken as a parameter reflecting a communication quality. Moreover a signal to noise ratio of the secondary system communicating over a transmission resource in the critical region of the secondary system can be estimated in any appropriate method, for example, in any one of examples of methods described below with reference to Equations (1) to (8). Of course this disclosure will not be limited to these embodiments or examples.

Then in the step 208-3, the available transmission resource is allocated to the secondary system according to a result of assessing in the step 208-2.

In an example, it can be judged whether the estimated optimum communication quality reaches a predetermined quality threshold (the threshold can be determined by a practical demand in a practical application and will not be limited here to a particular value), and if so, the transmission resource is allocated to the secondary system; otherwise, the transmission resource is not allocated to the secondary system.

Figure 3:
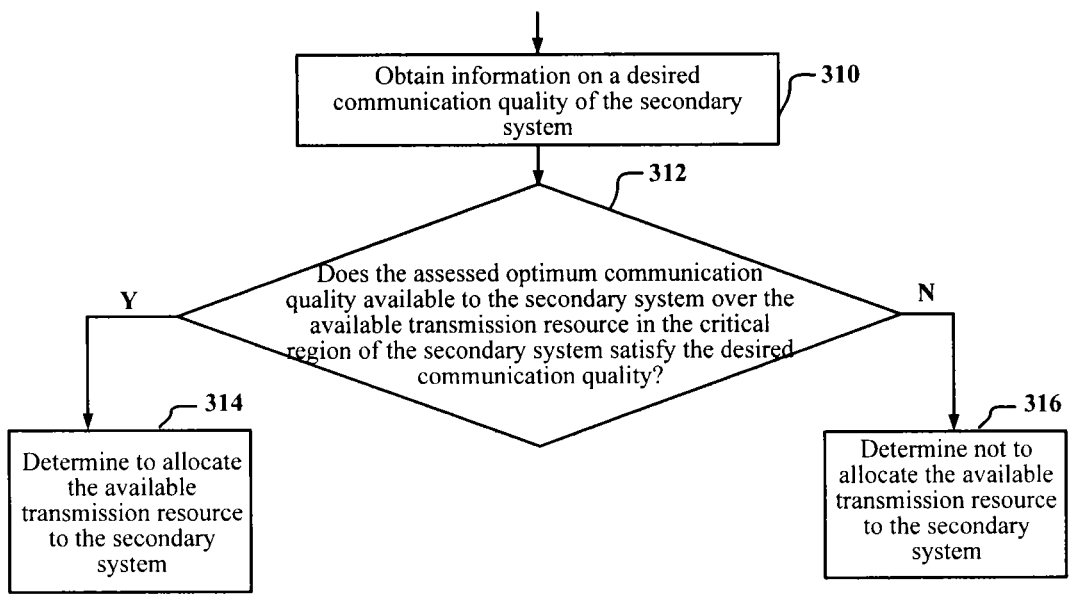
FIG. 3 is a schematic flow chart illustrating an example of a method for allocating a transmission resource to a secondary system based upon a desired communication quality of the secondary system.

In another example, it can be further judged whether the estimated optimum communication quality reaches a desired communication quality of the secondary system. FIG. 3 illustrates a schematic flow chart of a method for allocating a transmission resource to the secondary user based upon a desired communication quality of the secondary system in this example. As illustrated in FIG. 3, in a step 310, information on a desired communication quality of the secondary system is obtained. Information on the desired communication quality of the secondary system can be obtained, by the apparatus for allocating a wireless transmission resource in the secondary system, from a secondary base station of the secondary system. Alternatively the information can be pre-stored in the apparatus for allocating a wireless transmission resource of the secondary system (e.g., stored in the memory device therein (not illustrated)) and retrieved as needed for use. A detailed description thereof will be omitted here. Then in a step 312, it is judged whether the assessed optimum communication quality available to the secondary system over the available transmission resource in the critical region of the secondary system satisfies the desired communication quality of the secondary system.

In a particular example, if so, the available transmission resource is allocated to the secondary system (the step 314); otherwise, the available transmission resource is not allocated to the secondary system (a step 316). With this method, a waste of the transmission resource can be alleviated to thereby improve the use efficiency of the transmission resource. Optionally the secondary system can be further instructed to be restructured (or reconfigure) upon judging that the estimated optimum communication quality can not reach the desired communication quality so as to reselect an available transmission resource available to the secondary system among the transmission resources of the primary system. The restructuring or reconfiguration as mentioned here can include one or more of processes of optimizing or reselecting an antenna beam shape of a secondary base station, of re-clustering a plurality of secondary systems, etc. These processes will be described below, and a detailed description thereof will be omitted here.

In another particular example, if the assessed optimum communication quality is judged to exactly satisfy the desired communication quality of the secondary system, the available transmission resource is allocated to the secondary system; or if the assessed optimum communication quality is judged to be above the desired communication quality of the secondary system, the transmission resource allocated to the secondary system can be lowered instead of allocating the entire available transmission resource to the secondary system. If the assessed optimum communication quality is judged to be above the desired communication quality of the secondary system, then simply a part of the available transmission resource to satisfy the desired communication quality of the secondary system can be allocated to the secondary system. For example, a spectrum resource available to the secondary user is calculated from an interference threshold of a primary user and interference of the secondary user to the primary user in the critical region as maximum transmission power of 20 dB at a bandwidth in a frequency band. Assumed there is transmission path attenuation 5 dB of a transmitter of the secondary user to the critical region of the secondary user. Assumed there is transmission power 30 dB of the primary user and transmission path attenuation 15 dB of a transmitter of the primary user to the critical region of the secondary user. Then there is a signal to noise ratio of the critical region of the secondary user, which is 20−5−(30−15)=0 dB in the spectrum allocated to secondary user. If the desired communication quality of the secondary system is a signal to noise ratio of only −5 dB, then at this time the assessed optimum communication quality (the signal to noise ratio of 0 dB) is above the desired communication quality of the secondary system (the signal to noise ratio of −5 dB), then the transmission power allocated to the secondary system can be lowered. With the model described above, the application demand of the secondary user can simply be satisfied at transmission power of −5+(30−15)+5=15 dB, and then the transmission power allocated to the secondary system can be lowered, that is, simply the transmission power of 15 dB can be allocated thereto. With the method in this particular example, the available transmission resource can be further saved to thereby allocate the spared available transmission resource to another secondary system. Thus the use efficiency of the transmission resources can be further improved.

After the available transmission resource among the transmission resources of the primary system is allocated to the secondary system, the apparatus for managing wireless transmission resources in the secondary system can send an allocation result to the secondary base station or the secondary user in the secondary system or can send the allocation result to the secondary base station which further distributes the allocation result to the secondary user. Thus the respective secondary users can communicate over the allocated transmission resources.

Figure 4:
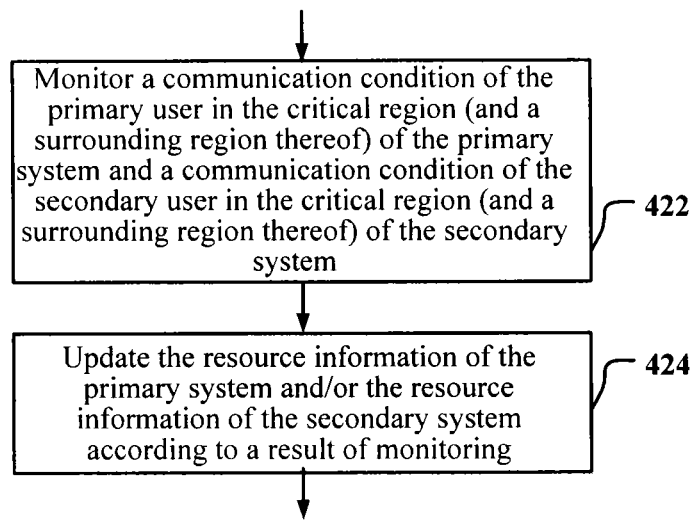
FIG. 4 is a schematic flow chart illustrating an example of a method for updating system resource information.

A use condition of the transmission resource can be further monitored after the transmission resource is allocated as described above. FIG. 4 illustrates an example of a method for monitoring the use of a transmission resource after the transmission resource is allocated.

Figure 20:
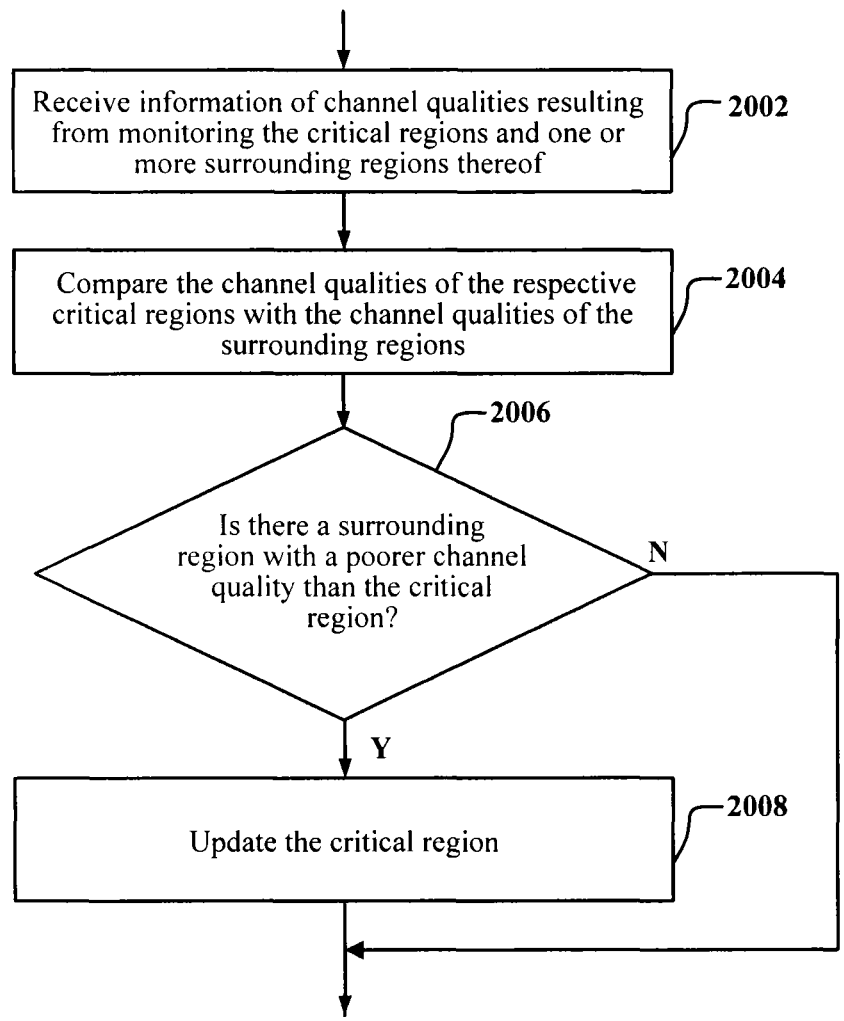
FIG. 20 is a schematic flow chart illustrating an example of a method for updating a critical region.

As illustrated in FIG. 4, the method includes steps 422 and 424. Particularly in the step 422, a communication condition of the primary user in the critical region of the primary system is monitored, and a communication condition of the secondary user in the critical region of the secondary system is monitored. Similarly to the foregoing description, information on a communication quality of the primary user in the critical region of the primary system can be obtained, by the apparatus for managing wireless transmission resources in the secondary system, from the primary base station in the primary system, and a detailed description will be omitted here. Information on a communication condition of the secondary user in the critical region of the secondary system can be obtained, by the apparatus for managing wireless transmission resources in the secondary system, from the secondary base station or the secondary user in the secondary system, and a detailed description will be omitted here. For example, the apparatus for managing wireless transmission resources can send information on the critical region of the secondary system to the secondary base station or the secondary user (or can firstly send it to the secondary base station which in turn distributes it to the secondary user), and the concerned secondary base station and/or secondary user (e.g., the secondary base station and/or the secondary user located in the critical region) sends information of a communication condition as a result of its own utilization of the allocated transmission resource to the apparatus for managing wireless transmission resources. A detailed description will be omitted here. Then in the step 424, the resource information of the primary system and/or the resource information of the secondary system, e.g., a channel model thereof, etc., is updated according to a result of monitoring. The updated information can be saved in the apparatus for managing wireless transmission resources (e.g., the memory device thereof) for use in subsequent allocation of a transmission resource again. The information on a communication condition as mentioned here can include one or more the following information: signal strength and spectrum utilization of the primary user, signal strength and spectrum utilization of the secondary user, signal power variation statistical information of the primary user, signal strength statistical information of the secondary user, etc. Optionally a communication condition of the primary user in a surrounding region of the critical region of the primary system can be further monitored, and a communication condition of the primary user in a surrounding region of the critical region of the secondary system can be further monitored. The surrounding region as mentioned here refers to a region located around the critical region (a region located around the critical region can be selected dependent upon a practical application as the surrounding region, and this disclosure will be not limited here in this respect). Since both the critical region of the primary system and the critical region of the secondary system are estimated based upon channel models, coverage areas and other information and the channel models are hypothetic statistical models, the estimated critical region of the primary system and critical region of the secondary system may deviate from real critical regions, and surrounding regions of the estimated critical regions are monitored so that the system resource information can be updated and the previously estimated critical regions can be revised to thereby make a subsequent resource allocation process more accurate and effective. FIG. 20 illustrates an example of a method for updating (revising) a critical region according to information resulting from monitoring a surrounding region of the critical region. As illustrated in FIG. 20. In a step 2002, information of channel qualities or the like resulting from monitoring the critical regions and one or more surrounding regions thereof is received. The information can be acquired by the PU, the SU, the PBS or the SBS. In a step 2004, the channel qualities of the respective critical regions are compared with the channel qualities of the surrounding regions thereof, and in a step 2006, it is judged whether there is a surrounding region with a poorer channel quality than the critical region, and if so, then in a step 2008, the critical region is updated. The method illustrated in FIG. 20 is applicable to both updating the critical region of the primary system and updating the critical region of the secondary system. Moreover those skilled in the art can appreciate that a channel quality can be estimated from a control scheme of emission power, the emission power and a channel model of a base station, locations of the base station and a user, a emission mask of a emitter and/or a characteristic of a receiver or the like in any appropriate method, and a detailed description thereof will be omitted here.

In the method described, the resource information of the primary system and/or the resource information of the secondary system is updated according to a change in system state in the communication system. Since the updated information reflects a real state of the system, subsequent resource allocation can be made more accurate and effective.

In some embodiments, the secondary system can be rebuilt according to a result of monitoring illustrated in FIG. 4.

In another embodiment, the primary user and the secondary user in the primary and secondary system can be switched. For example, the secondary system (e.g., the apparatus for managing wireless transmission resources) can receive a handover request of the primary user in the primary system who is located in the critical region of the primary system for a handover to the secondary system when the communication quality of the primary user in the critical region of the primary system is below a predetermined communication quality threshold. In another example, a handover request of the secondary user in the secondary system who is located in the critical region of the secondary system for a handover to the primary system is sent to the primary system when the communication quality of the secondary user in the critical region of the secondary system is below a predetermined communication quality threshold.

Figure 5:
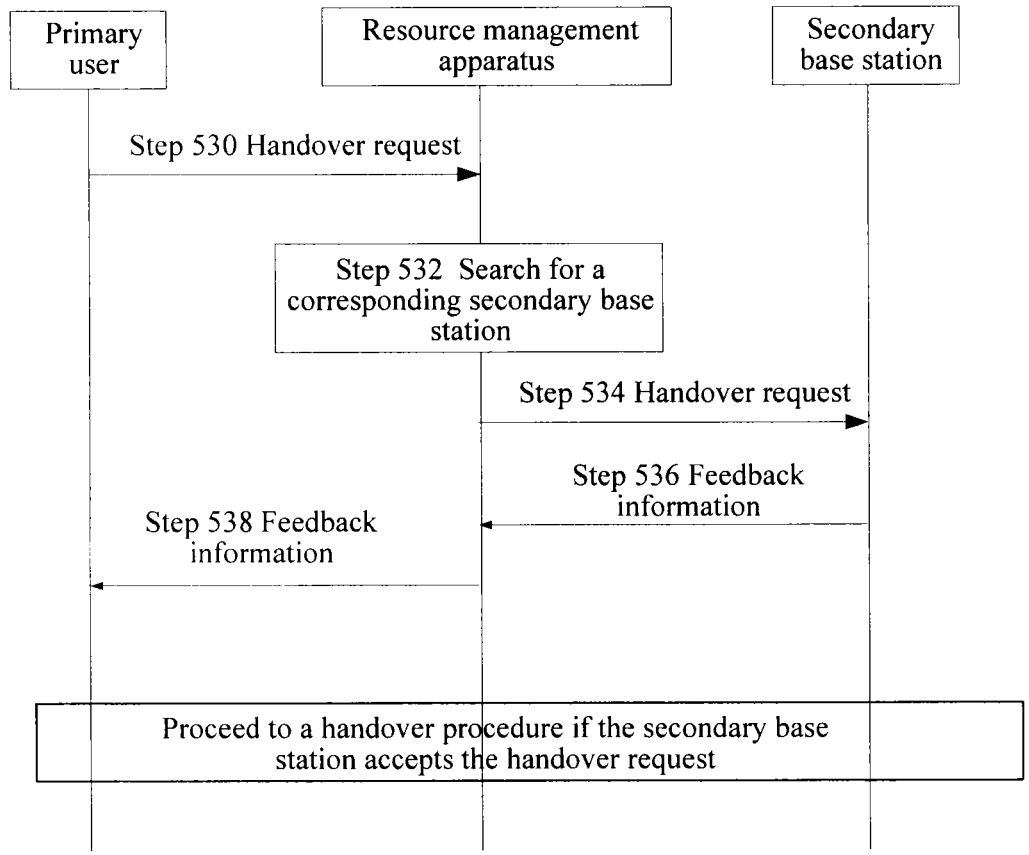
FIG. 5 is a schematic flow chart illustrating an example of a method for switching a primary user to a secondary system.

FIG. 5 illustrates a particular example of a process for a request of the primary user for a handover to the secondary system. As illustrated in FIG. 5, in a step 530, a request of the primary user for a handover from the primary system to the secondary system is received, where the handover request can include location information and identifier (ID) information of the primary user, transmission resource utilization information of the primary user, etc. The transmission resource utilization information can include a transmission rate, a used bandwidth, and an emission mask, etc., of the primary user. In a step 532, the coverage area of the secondary system is searched according to the location information of the primary user for a service region of the secondary user covering the primary user. That is, it is judged whether the primary user is located in a service region of a certain secondary user, and if so, then the process proceeds to a next step 534; otherwise, the process ends. After a base station of the secondary user serving the service region of the secondary user is found in the step 532, the handover request is sent to the found secondary base station in the step 534. In a step 536, feedback information from the secondary base station to the handover request is received. The feedback information can include information on whether the secondary base station accepts the handover request of the primary user and transmission setting (e.g., a bandwidth, a rate, etc.) of the secondary base station so that the primary user can adjust transmission setting accordingly prior to an access to the secondary system. In a step 538, the feedback information from the secondary base station and a suggestion on spectrum occupancy (including a suggested bandwidth, rate, etc.) of the primary user is sent to the primary user so that the primary user accesses the secondary system without adverse influence upon the existing secondary user system. For example, assuming the secondary base station accepts the handover request and the secondary base station is a femtocell base station of an Open Subscriber Group (OSG) or a femtocell base station of a hybrid subscriber group. Then the primary user can proceed to a handover procedure, and a detailed description thereof will be omitted here. If the secondary base station does not support the handover request of the primary user (for example, assuming the secondary base station is a femtocell base station of a closed subscriber group), then the primary user can not be switched to the secondary system.

Figure 6:
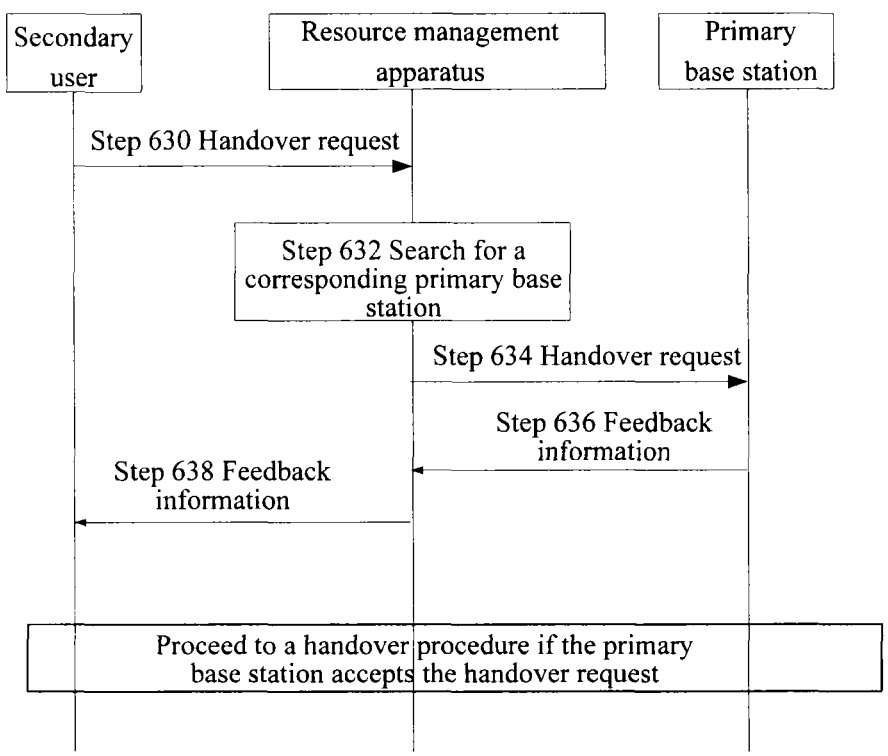
FIG. 6 is a schematic flow chart illustrating an example of a method for switching a secondary user to a primary system.

FIG. 6 illustrates a particular example of a process for a request of the secondary user for a handover to the primary system. As illustrated in FIG. 6, in a step 630, a handover request of the secondary user for a handover to the primary system is received, where the handover request can include location information, an identifier (ID), and transmission resource utilization information, etc., of the secondary user. The transmission resource utilization information can include a transmission rate, a used bandwidth, and a emission mask, etc., of the secondary user. In a step 632, the coverage area of the primary system is searched according to the location of the user for a service region of the primary user covering the secondary user. If the secondary user is judged to be located in a service region of a certain primary user, then the process proceeds to a next step 634; otherwise, the process ends. In the step 634, the handover request is sent to a found primary base station. In a step 636, feedback information from the primary base station to the handover request is received. The feedback information can include information on whether the primary base station accepts the handover request of the secondary user and transmission setting (e.g., a bandwidth, a rate, etc.) of the primary base station so that the secondary user can adjust transmission setting accordingly prior to an access to the primary system. In a step 638, the feedback information from the primary base station and a suggestion on spectrum occupancy (including a suggested bandwidth, rate, etc.) of the secondary user is sent to the secondary user so that the secondary user accesses the primary user system without adverse influence upon the existing primary user system. If the primary base station accepts the handover request, then the secondary user proceeds to a handover procedure, and a detailed description thereof will be omitted here. If the primary base station does not support the handover request of the secondary user, then the secondary user can not be switched to the primary system.

It shall be appreciated that the handover processes of the primary and secondary users are applicable only to an application scenario in which communication mechanisms of the primary and secondary systems are mutually compatible, and a detailed description thereof will be omitted here.

In another embodiment, an antenna beam shape of a secondary base station can be further optimized according to the result of monitoring as illustrated in FIG. 4.

For example, a traditional two-dimension antenna beam can only be formed (for example, with a sector antenna, a linear array of antennas, a circular array of antennas, etc.) by controlling antenna emission power at different angles on a horizontal plane. It is very likely for the critical region of the primary system and the critical region of the secondary system to be located at the same horizontal angle but different elevations, on a horizontal plane, starting from the primary base station. At this time it is necessary to optimize power of an antenna beam shape at different elevations on a vertical plane. Particularly given the provided information of the critical region of the primary system and the critical region of the secondary system, antenna beam shapes of the primary base station and the secondary base station can be adjusted in terms of three-dimension antennas according to the information. Particularly antenna beam power of an antenna beam of the primary base station in the critical region of the primary system is boosted while lowering antenna beam power of the antenna beam of the primary base station in the critical region of the secondary system. This method can also be applicable to optimization of an antenna beam shape of the secondary base station. Particularly power of the antenna beam of the secondary base station in the critical region of the secondary user is boosted while lowering antenna beam power of the antenna beam of the secondary base station in the critical region of the primary system according to the information resulting from monitoring the critical region of the primary system and the critical region of the secondary system.

In another embodiment, an antenna beam shape of a base station can be further selected using the information of the critical region of the primary system and the critical region of the secondary system. Particularly communication qualities of a primary user in the critical region of the primary system and communication qualities of a secondary user in the critical region of the secondary system under different antenna beam shapes of a secondary base station can be obtained. Similarly to the foregoing description, for example, a signal to noise ratio can be taken as a parameter reflecting the communication quality. As described above, a signal to noise ratio of a region can be obtained in any appropriate method, and a detailed description thereof will be omitted here. Then an antenna beam shape of the secondary base station is selected according to the communication qualities of the secondary user in the critical region of the secondary system (and optionally the communication qualities of the primary user in the critical region of the primary system) under the different antenna beam shapes of the secondary base station.

In an example, communication qualities in the critical region of the secondary system under different antenna beam shapes of a secondary base station can be obtained, and the antenna beam shape corresponding to the optimum communication quality can be selected as the antenna beam shape of the secondary base station. In this example, an antenna beam shape of the secondary base station can be selected using the measurement result of the communication condition in the critical region of the secondary system to thereby further improve the communication quality of the secondary system.

Figure 7:
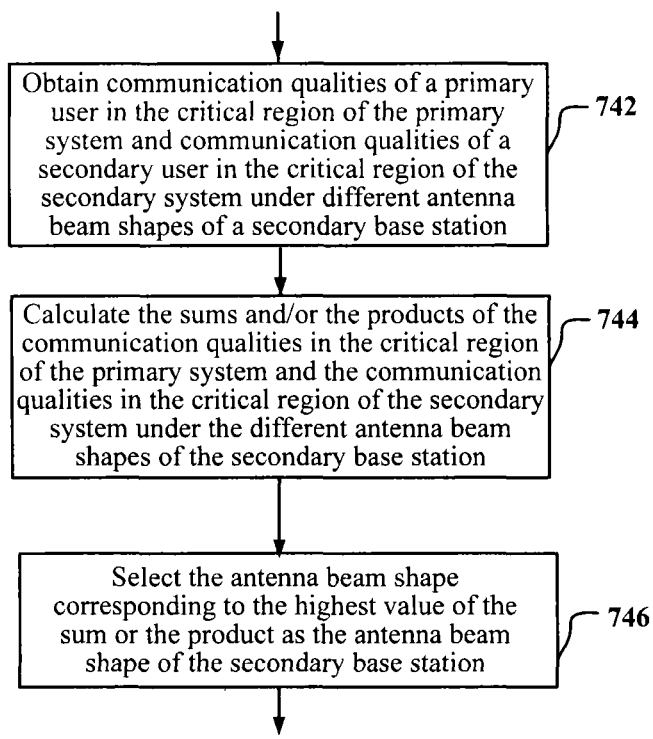
FIG. 7 is a schematic flow chart illustrating an example of a method for selecting an antenna beam shape of a secondary base station.

In another example, FIG. 7 illustrates another method for selecting an antenna beam shape of a base station. Particularly in a step 742, communication qualities of a primary user in the critical region of the primary system and communication qualities of a secondary user in the critical region of the secondary system under different antenna beam shapes of a secondary base station are obtained. Information of the communication qualities can be obtained in the method described above, and a repeated description thereof will be omitted here. Then in a step 744, the sums and/or the products of the communication qualities in the critical region of the primary system and the communication qualities in the critical region of the secondary system under the different antenna beam shapes of the secondary base station are calculated. Finally in a step 746, the antenna beam shape corresponding to the highest value of the sum or the product is selected as the antenna beam shape of the secondary base station. In the method illustrated in FIG. 7, both the measurement result of the communication condition in the critical region of the secondary system and the measurement result of the communication condition in the critical region of the primary system are taken into account. With the antenna beam shape of the secondary base station thus selected, the communication quality of the secondary system can be further improved while inhibiting interference to the primary system.

Figure 23:
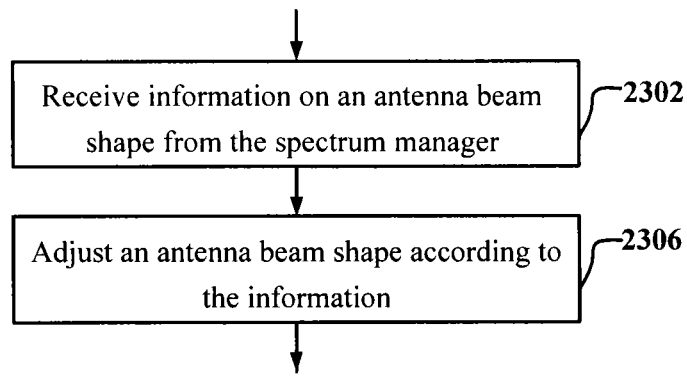
FIG. 23 is a schematic flow chart illustrating an example of a method for adjusting an antenna beam shape by a secondary base station.
Figure 24:
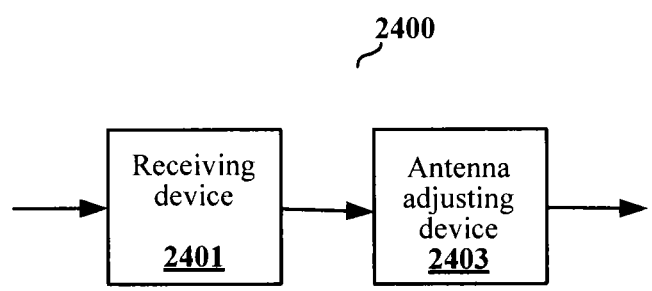
FIG. 24 is a schematic block diagram illustrating a processing apparatus in the secondary base station to perform the method illustrated in FIG. 23.

The method for selecting or determining an antenna beam described above can be performed by the secondary base station or can be performed by a spectrum manager related to the secondary base station. The related spectrum manager as mentioned here can be a primary spectrum manager as described below or a secondary spectrum manager of a secondary system cluster in which the secondary base station is located. In the case that an antenna beam shape is determined or selected by the spectrum manager, the spectrum manager can send information on the determined or selected antenna beam shape to the secondary base station. FIG. 23 is a schematic flow chart illustrating an example of a method for adjusting by the secondary base station an antenna beam shape thereof using the information. As illustrated in FIG. 23, the secondary base station receives information on an antenna beam shape from the spectrum manager in a step 2302 and then adjusts an antenna beam shape according to the information in a step 2306. FIG. 24 is a schematic block diagram illustrating a processing apparatus 2400 in the secondary base station to perform the method illustrated in FIG. 23. As illustrated in FIG. 24, the processing apparatus 2400 includes a receiving device 2401 and an antenna adjusting device 2403. The receiving device 2401 is configured to receive information on an antenna beam shape from the spectrum manager. The antenna adjusting device 2403 is configured to adjust an antenna beam shape of the secondary base station according to the received information.

The method for selecting an antenna beam shape described above can also be applicable to selection of an antenna beam shape of the primary base station, and a repeated description thereof will be omitted here.

In some embodiment, in the case that there are a plurality of secondary systems, these secondary systems can be clustered into a plurality of secondary system clusters. Each secondary system cluster can include one or more secondary systems. The secondary systems can be clustered in any appropriate method, and a detailed description thereof will be omitted here. For example, the secondary systems can be clustered according to location distributions of secondary base stations and secondary users therein. In another example, the secondary systems can be clustered according to transmission resource utilization characteristics (e.g., the same or adjacent spectrums and/or the same communication scheme or other characteristics) and controllabilities thereof. Transmission resources of a cluster are utilized dependent upon communication schemes of respective secondary systems in the cluster.

In the case that the secondary systems are clustered, the embodiments or examples of the respective methods which have been described above or which will be described below can be applied to each cluster treated as a whole. For example, an available transmission resource available to the secondary system can be determined as above by determining an available transmission resource available to each secondary system cluster among the transmission resources of the primary system. The same holds true for the other aspects, which will not be enumerated here.

Figure 15:
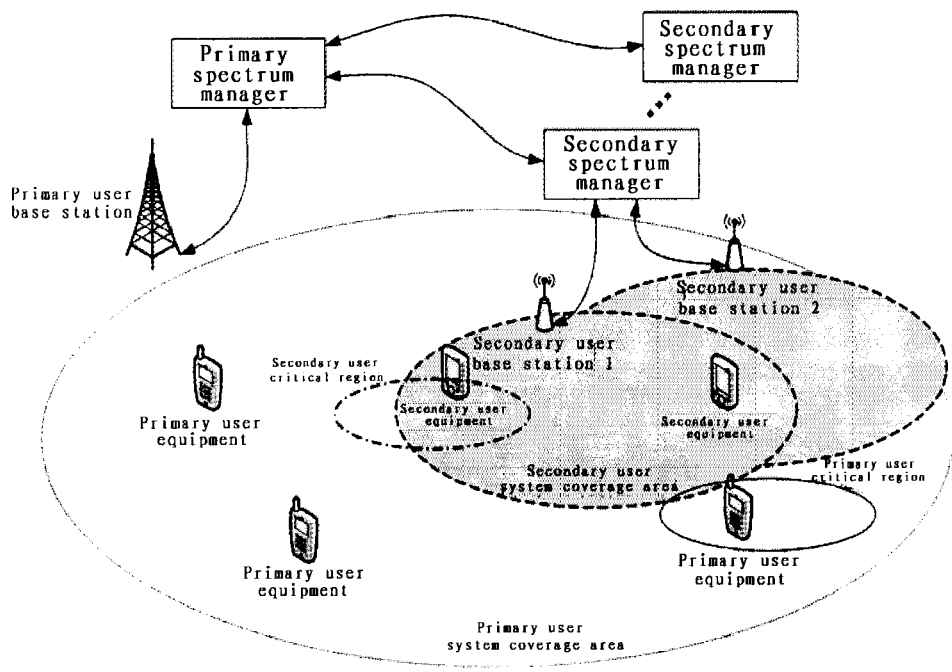
FIG. 15 is a schematic diagram illustrating a wireless system scenario to which an embodiment of this disclosure can be applied.

In an embodiment, a plurality of spectrum managers can be arranged for the secondary systems. FIG. 15 illustrates such a system configuration. As illustrated in FIG. 15, a primary spectrum manager and one or more secondary spectrum managers can be arranged. The primary spectrum manager manages one or more secondary user clusters and can receive information of the secondary user cluster(s) from the secondary spectrum managers. Each secondary spectrum manager can manage a single secondary system cluster and secondary users in the cluster. For example, each secondary spectrum manager can model aggregated interference of the secondary users to a primary user per cluster, transport the information of the secondary user cluster to the primary spectrum manager, accept information from the primary spectrum manager, and manage the secondary users in the cluster, etc.

In a particular embodiment, the primary spectrum manager can perform centrally the methods in the respective embodiments or examples described above with reference to FIG. 1 to FIG. 7 or below with reference to FIG. 8 to FIG. 14 and can send various related process results (e.g., a result of allocating a transmission resource) to the secondary spectrum managers and receive information from the secondary spectrum managers (e.g., system resource information of the secondary systems and/or measurement results of the secondary systems on the critical regions of the secondary systems, etc.).

In another particular example, the methods in the respective embodiments or examples described above with reference to FIG. 1 to FIG. 5 and FIG. 20 and below with reference to FIG. 8 to FIG. 14 can be distributed to the respective secondary spectrum managers for performance so as to alleviate a process burden on the primary spectrum manager. For example, the methods in the respective embodiments or examples described above with reference to FIG. 1 to FIG. 5 and FIG. 20 and below with reference to FIG. 8 to FIG. 14 can be performed respectively by each secondary spectrum manager to allocate a transmission resource to the secondary systems in each secondary system cluster, and each secondary spectrum manager can send its allocation result to the primary spectrum manager. When a plurality of secondary spectrum managers corresponding to a plurality of secondary user clusters access the primary spectrum manager concurrently, the primary spectrum manager will coordinate allocation of available resources. The secondary spectrum managers can also coordinate between them to allocate available resources. This coordination can be performed in a game theory method, a distributed decision making method or other methods, and a detailed description thereof will be omitted here.

In the case that each secondary system cluster is arranged with a secondary spectrum manager and a primary spectrum manager, the methods described above with reference to FIG. 1 to FIG. 6 and FIG. 20 can be performed by the primary spectrum manager, but information interaction between the primary spectrum manager and the respective secondary system clusters can be performed through the respective secondary spectrum managers, and a repeated description thereof will be omitted here.

In a particular embodiment, a plurality of secondary systems can be re-clustered according to a change in system information (e.g., according to the result of monitoring in the step 422 in FIG. 4) into new secondary system clusters. Thus a transmission resource can be allocated per new secondary system cluster to thereby utilize the transmission resources more effectively.

Some examples of calculating the critical region of the primary system and the critical region of the secondary system will be described below.

Figure 8:
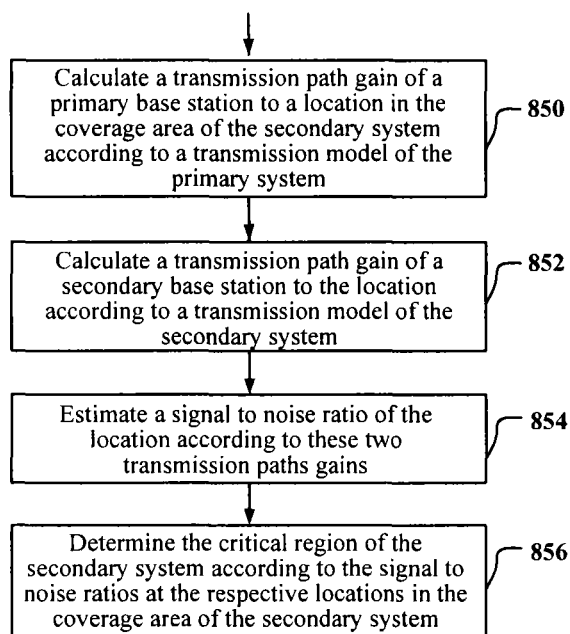
FIG. 8 is a schematic flow chart illustrating an example of a method for estimating a critical region of a secondary system.

FIG. 8 illustrates an example of a method for estimating the critical region of the secondary system.

As illustrated in FIG. 8, in a step 850, a transmission path gain of a primary base station to a location in the coverage area of the secondary system is calculated according to a channel model of the primary system; and in a step 852, a transmission path gain of a secondary base station to the location is calculated according to a channel model of the secondary system. Then in a step 854, a signal to noise ratio of the location is estimated according to these two transmission paths gains. The location as mentioned here can be a region or a point in the coverage area of the secondary system. The coverage area of the secondary system can be segmented into a plurality of regions, and a signal to noise ratio in each region or at a point in each region can be calculated in the process of the steps 850, 852 and 854. Then in a step 856, the critical region of the secondary system is determined according to the signal to noise ratios at the respective locations in the coverage area of the secondary system. Particularly a region with a lower signal to noise ratio (e.g., a region with a signal to noise ratio below a predetermined threshold) can be determined as the critical region of the secondary system. The threshold can be determined by a practical demand in a practical application and will not be limited here to a particular value.

Figure 9:
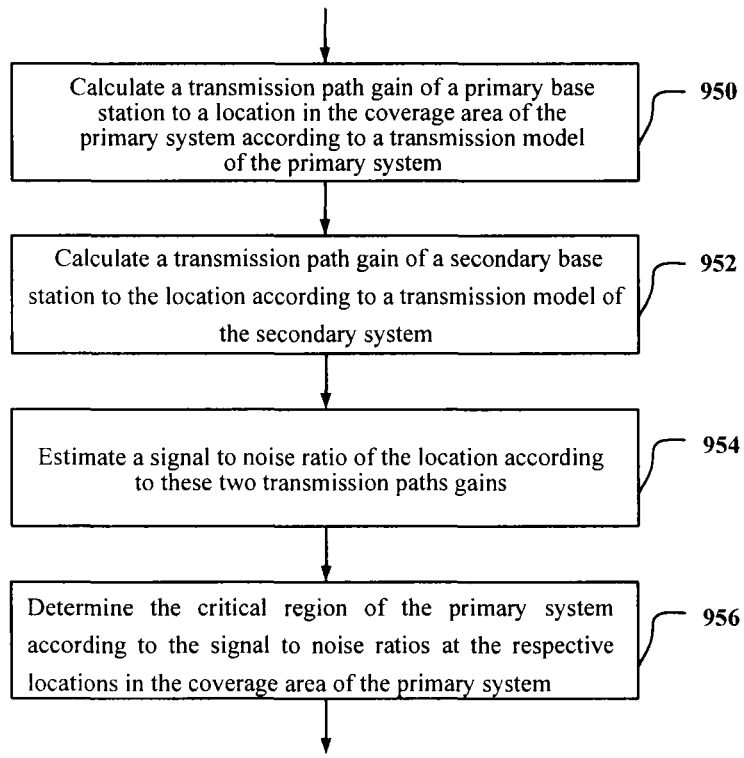
FIG. 9 is a schematic flow chart illustrating an example of a method for estimating a critical region of a primary system.

FIG. 9 illustrates an example of a method for estimating the critical region of the primary system similar to FIG. 8. As illustrated in FIG. 9, in a step 950, a transmission path gain of a primary base station to a location in the coverage area of the primary system is calculated according to a channel model of the primary system; and in a step 952, a transmission path gain of a secondary base station to the location in the coverage area of the primary system is calculated according to a channel model of the secondary system. Then in a step 954, a signal to noise ratio of the location is estimated according to these two transmission paths gains. The location as mentioned here can be a region or a point in the coverage area of the primary system. The coverage area of the primary system can be segmented into a plurality of regions, and a signal to noise ratio in each region or at a point in each region can be calculated in the process of the steps 950, 952 and 954. Then in a step 956, the critical region of the primary system is determined according to the signal to noise ratios at the respective locations in the coverage area of the primary system. Particularly a region with a lower signal to noise ratio (e.g., a region with a signal to noise ratio below a predetermined threshold) can be determined as the critical region of the primary system. The threshold can be determined by a practical demand in a practical application and will not be limited here to a particular value.

A particular example will be given below of the methods for estimating the critical region of the primary system and the critical region of the secondary system in FIG. 8 and FIG. 9. Assumed emission power of the primary base station is $P_t^{(PU)}$, and emission power of the secondary base station is $P_t^{(SU)}$, and assumed a signal to noise ratio in a small region s (given a channel path loss constant throughout the small region) in a service region S of the secondary system will be calculated. Based upon the methods in FIG. 8 and FIG. 9, the illustrated critical regions are calculated per channel path loss. These critical regions are regions with a lower long-time average signal to interference ratio (or referred to as signal to noise ratio) of a user. Firstly a transmission path gain $G_{PU-s}$ of the primary base station to s is calculated according to the channel model of the primary system (different channel models (e.g., a free-space model, a transmission path model given by the ITU, a HATA model, etc.) can be selected according to setting of the primary system (e.g., an antenna height, an application context, etc.), and the transmission path gain can be calculated in any appropriate method, and a detailed description thereof will be omitted here), and a transmission path gain $G_{SU-s}$ of the secondary base station to s is calculated according to the channel model of the secondary system. A signal to interference ratio at any point in s can be calculated in the equation of:

$$SIR_{SU}(s) = \frac{G_{SU-s} P_t^{(SU)}}{G_{PU-s} P_t^{(PU)}}, \exists s \in S \quad (1)$$

A region with a lower signal to interference ratio described above (e.g., below a predetermined threshold, and the threshold can be determined by a practical demand in a practical application and will not be limited here to a particular value) in the service region of the secondary user can be determined as the critical region of the secondary system.

As a variant of the example in Equation (1), since the signal to interference ratio varies independent of $P_t^{(PU)}$ and $P_t^{(SU)}$ but only dependent upon the location, the critical region of the secondary system can be determined by calculating the ratio $$\frac{G_{SU-s}}{G_{PU-s}}$$

of $G_{SU-s}$ and $G_{PU-s}$. That is, a region with a lower $$\frac{G_{SU-s}}{G_{PU-s}}$$

(e.g., below a predetermined threshold, and the threshold can be determined by a practical demand in a practical application and will not be limited here to a particular value) in the service region of the secondary user can be determined as the critical region of the secondary system. In a particular example, a region with $$\frac{G_{SU-s}}{G_{PU-s}}$$

below the average of $$\frac{G_{SU-s}}{G_{PU-s}}$$

of the respective small regions in the entire service region S can be defined as a surrounding region of the critical region of the secondary system.

Also for a small region q (given a channel path loss constant throughout the small region) in a service region Q of the primary user, a transmission path $G_{PU-q}$ gain of the primary base station to q is calculated according to the channel model of the primary system, and a transmission path $G_{SU-q}$ of the secondary base station to q gain is calculated according to the channel model of the secondary system. A signal to interference ratio at any point in q can be calculated in the equation of:

$$SIR_{PU}(q) = \frac{G_{PU-q} P_t^{(PU)}}{G_{SU-s} P_t^{(SU)}}, \exists q \in Q \quad (2)$$

As a variant of Equation (2), the critical region of the primary system can be determined by calculating $$\frac{G_{SU-q}}{G_{PU-q}}$$

A small region with a lower $$\frac{G_{SU-q}}{G_{PU-q}}$$

(e.g., below a predetermined threshold, and the threshold can be determined by a practical demand in a practical application and will not be limited here to a particular value) among all the small regions in the service region of the primary user can be determined as the critical region of the primary system. In a particular example, a region with $$\frac{G_{SU-q}}{G_{PU-q}}$$

below the average of $$\frac{G_{SU-q}}{G_{PU-q}}$$

throughout the service region Q can be defined as a surrounding region of the critical region of the primary system.

Figure 10:
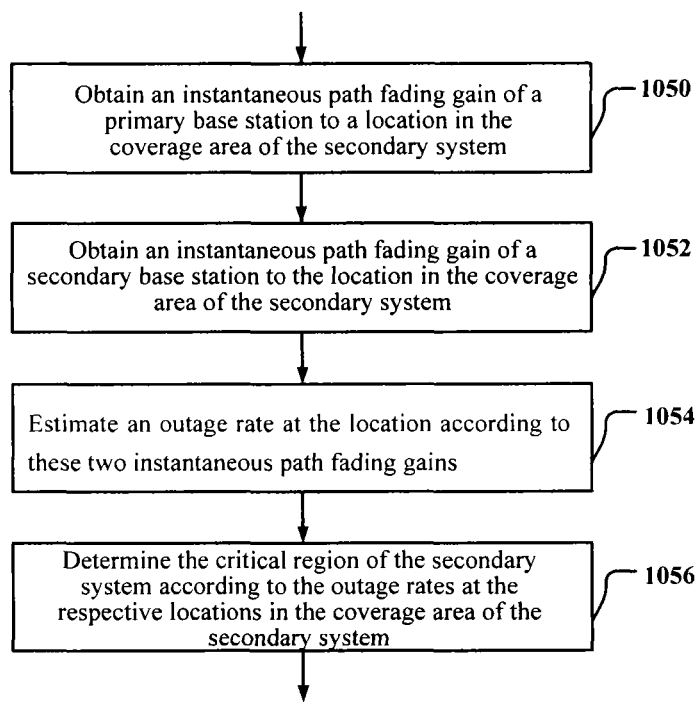
FIG. 10 is a schematic flow chart illustrating another example of a method for estimating a critical region of a secondary system.
Figure 11:
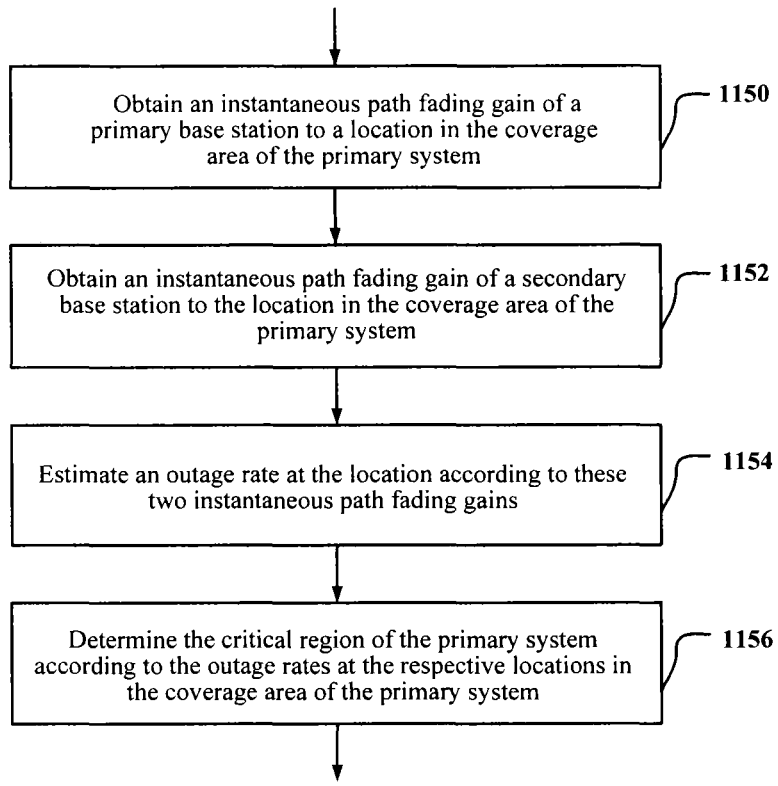
FIG. 11 is a schematic flow chart illustrating another example of a method for estimating a critical region of a primary system.

FIG. 10 illustrates another example of a method for estimating the critical region of the secondary system, and FIG. 11 illustrates an example of a corresponding method for estimating the critical region of the primary system.

As illustrated in FIG. 10, in a step 1050, a distribution of instantaneous small-scale path fading gains of a primary base station to a location in the coverage area of the secondary system is selected according to an application scenario of the primary and secondary user systems, and in a step 1052, a distribution of instantaneous small-scale path fading gains of a secondary base station to the location in the coverage area of the secondary system is obtained. These small-scale path fading gains may comply with a Rayleigh distribution, a Gamma distribution, a Ricean distribution, a Nakagami distribution, etc. A small-scale fading model may vary with a different location. For example, some location is close to a house, and some location is open. Moreover the channel model may vary with a different height of an antenna of a receiver of a user. The distributions of instantaneous small-scale path fading gains can be obtained in any appropriate method, and a detailed description thereof will be omitted here. Then in a step 1054, an outage rate at the location is estimated according to these distributions of two instantaneous path fading gains. Similarly to the foregoing description, the location as mentioned here can be a region or a point in the coverage area of the secondary system. The coverage area of the secondary system can be segmented into a plurality of regions, and an outage rate in each region or at a point in each region can be calculated in the process of the steps 1050, 1052 and 1054. Then in a step 1056, the critical region of the secondary system is determined according to the outage rates at the respective locations in the coverage area of the secondary system.

As illustrated in FIG. 11, in a step 1150, a distribution of instantaneous small-scale path fading gains of a primary base station to a location in the coverage area of the primary system is obtained, and in a step 1152, a distribution of instantaneous small-scale path fading gains of a secondary base station to the location in the coverage area of the primary system is obtained. In a step 1154, an outage rate at the location is estimated according to these distributions of two instantaneous path fading gains. Similarly to the foregoing description, the location as mentioned here can be a region or a point in the coverage area of the primary system. The coverage area of the primary system can be segmented into a plurality of regions, and an outage rate in each region or at a point in each region can be calculated in the process of the steps 1150, 1152 and 1154. Then in a step 1156, the critical region of the primary system is determined according to the outage rates at the respective locations in the coverage area of the primary system.

A particular example will be given of the methods for estimating the critical region of the primary system and the critical region of the secondary system in FIG. 10 and FIG. 11. In the examples of FIG. 10 and FIG. 11, an outage rate is calculated according to the ratio of small-scale fading gains. At this time the critical region means a region with a higher user outage rate. The outage rate represents a probability that a communication quality of a user is below a lowest limit threshold (the threshold can be determined by a practical demand in a practical application and will not be limited here to a particular value). Assumed an instantaneous path fading gain of the primary base station to a location or a small region s in a service region S of the secondary user is $g_{PU-S}$, and a short-time path fading gain of the secondary base station to the location s in the service region of the secondary user is $g_{SU-S}$.

The ratio $$\frac{g_{SU-s}}{g_{PU-s}}$$

of small-scale fading gains at any location s in the service region of the secondary user is calculated. The ratio is a random variable complying with a specific distribution, and a detailed description thereof will be omitted here. Assumed α represents an outage rate of the secondary system user and, for example, can take the value of 5%. For each region s in the service region of the secondary user, a threshold r(s, α) given the outage rate is obtained according to a distribution of ratios of small-scale fading gains, that is, the ratio of small-scale fading gains is below the threshold r(s, α) at a probability of α as represented in the equation of:

$$Pr\left\{\frac{g_{SU-s}}{g_{PU-s}} < r(s, \alpha)\right\} = \alpha \qquad (3)$$

Pr{x} represents a probability of an event x. After the thresholds r(s, α), given the outage rate, of all the regions S in the coverage area of the secondary system are calculated, a region with lowest or lower r(s, α)(for example, below a predetermined threshold, and the threshold can be determined by a practical demand in a practical application and will not be limited here to a particular value) can be determined as the critical region of the secondary system. In a particular example, r(s, α) is averaged throughout the regions as $\overline{r(s,\alpha)}$, and a region with r(s, α) below $\overline{r(s,\alpha)}$ can be determined as a surrounding region of the critical region of the secondary system.

Also for the primary system, assumed $g_{PU-q}$ and $g_{SU-q}$ represent short-time path fading of the primary base station and the secondary station to a location or a small region q in a service region of the primary system respectively. Moreover assumed β represents the value of an outage rate of a primary system user. For reach region q in the service region of the primary system, a threshold r(q, β) given the outage rate is obtained according to a distribution of ratios $$\frac{g_{PU-q}}{g_{SU-q}}$$

of small-scale fading gains, that is:

$$Pr\left\{\frac{g_{PU-q}}{g_{SU-q}} < r(q, \beta)\right\} = \beta \qquad (4)$$

Then after the thresholds r(q, β) given the outage rate are calculated for all the regions Q, a region with lowest or lower r(q, β) (for example, below a predetermined threshold, and the threshold can be determined by a practical demand in a practical application and will not be limited here to a particular value) can be determined as the critical region of the primary system. In a particular example, a region with r(q, β) below the average of r(q, β) throughout the region Q can be determined as a surrounding region of the critical region of the primary system.

Figure 12:
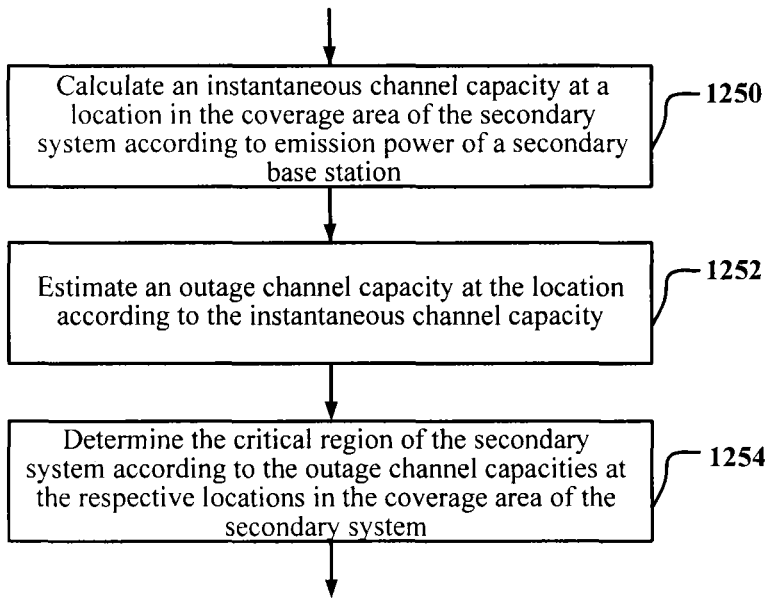
FIG. 12 is a schematic flow chart illustrating another example of a method for estimating a critical region of a secondary system.
Figure 13:
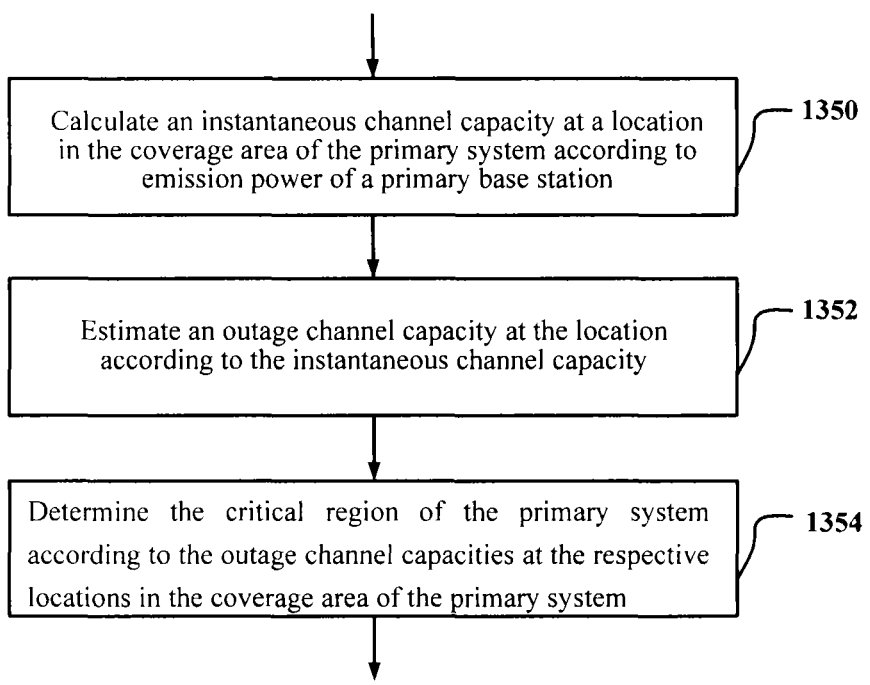
FIG. 13 is a schematic flow chart illustrating another example of a method for estimating a critical region of a primary system.

FIG. 12 illustrates another example of a method for estimating the critical region of the secondary system, and FIG. 13 illustrates example of a corresponding method for estimating the critical region of the primary system.

As illustrated in FIG. 12, in a step 1250, a distribution of instantaneous channel capacities at a location subject to interference of the primary system in the coverage area of the secondary system is calculated according to emission power of a secondary base station, and in a step 1252, an outage channel capacity at the location is estimated according to the distribution of instantaneous channel capacities. Similarly to the foregoing description, the location as mentioned here can be a region or a point subject to interference of the primary system in the coverage area of the secondary system. The coverage area of the secondary system can be segmented into a plurality of regions, and an outage channel capacity in each region or at a point in each region can be calculated in the process of the steps 1250 and 1252. Then in a step 1254, the critical region of the secondary system is determined according to the outage channel capacities at the respective locations in the coverage area of the secondary system.

As illustrated in FIG. 13, in a step 1350, a distribution of instantaneous channel capacities at a location subject to interference of the secondary system in the coverage area of the primary system is calculated according to emission power of a primary base station, and in a step 1352, an outage channel capacity at the location is estimated according to the distribution of instantaneous channel capacities. Similarly to the foregoing description, the location as mentioned here can be a region or a point subject to interference of the secondary system in the coverage area of the primary system. The coverage area of the primary system can be segmented into a plurality of regions, and an outage channel capacity in each region or at a point in each region can be calculated in the process of the steps 1350 and 1352. Then in a step 1354, the critical region of the primary system is determined according to the outage channel capacities at the respective locations in the coverage area of the primary system.

A particular example will be given of the methods for estimating the critical region of the primary system and the critical region of the secondary system in FIG. 12 and FIG. 13.

In the examples of FIG. 12 and FIG. 13, a communication quality is measured according to a channel capacity. An instantaneous channel capacity $C_{SU}(s)$ of a user equipment of the secondary system at a location or region s in a service region S of the secondary user can be calculated in the equation of:

$$C_{SU}(s) = B_{SU} \log_2\left(1 + \frac{g_{SU-s} P_t^{(SU)}}{g_{PU-s} P_t^{(PU)} + \sigma_{SU}^2}\right) \text{(Bit/s)} \quad (5)$$

Where $B_{SU}$ represents a bandwidth of the secondary system, and $\sigma_{SU}^2$ represents power of white noise of a receiver of the secondary user. These parameters can be obtained by the base station of the secondary user and the user equipment of the secondary user per application prior to communication of the system or can be set by default in the system. $P_t^{(PU)}$ represents emission power of the primary base station. $P_t^{(SU)}$ represents emission power of the secondary base station. These parameters can be set by default in the system (because a channel capacity varies in location almost independently of particular values of these parameters). $g_{PU-s}$ represents an instantaneous path fading gain of the primary base station to the location or small region s in the service region S of the secondary user, and $g_{PU-s}$ represents an short-time path fading gain of the base station of the secondary user to the location s in the service region of the secondary user.

An instantaneous channel capacity $C_{PU}(q)$ of a user equipment of the primary system at a location or region q in a service region Q of the primary user can be calculated in the equation of:

$$C_{PU}(q) = B_{PU} \log_2\left(1 + \frac{g_{PU-q} P_t^{(PU)}}{g_{SU-q} P_t^{(SU)} + \sigma_{PU}^2}\right) \text{(Bit/s)} \quad (6)$$

Where $B_{PU}$ represents a bandwidth of the primary system, and $\sigma_{PU}^2$ represents power of white noise of a receiver of the primary user. These parameters can be obtained by the base station of the secondary user and the user equipment of the secondary user per application prior to communication of the system or can be set by default in the system. $P_t^{(PU)}$ represents emission power of the primary base station. $P_t^{(SU)}$ represents emission power of the secondary base station. $g_{PU-q}$ and $g_{SU-q}$ represent short-time path fading gains of the primary base station and the secondary base station to the location or small region q in the service region of the primary system respectively.

Since the small-scale fading gain is a random variable, the instantaneous channel capacities of the primary and secondary systems are also random variables. Assumed $C'_{SU}(s, \alpha)$ and $C'_{PU}(q, \beta)$ represent outage channel capacities of the secondary system and the primary system at the locations s and q respectively. That is:

$$Pr\{C_{SU}(s) < C'_{SU}(s,\alpha)\} = \alpha \quad (7)$$

$$Pr\{C_{PU}(q) < C'_{PU}(q,\beta)\} = \beta \quad (8)$$

A region with lowest or lower $C'_{SU}(s, \alpha)$ and $C'_{PU}(q, \beta)$ (for example, below a predetermined threshold, and the threshold can be determined by a practical demand in a practical application and will not be limited here to a particular value) can be determined respectively as the critical region of the secondary system and the critical region of the primary system. Those regions with $C'_{SU}(s, \alpha)$ and $C'_{PU}(q, \beta)$ below the averages of $C'_{SU}(s, \alpha)$ and $C'_{PU}(q, \beta)$ respectively in the service region S of the secondary user and the service region Q of the primary user can be determined respectively as surrounding regions of the critical region of the secondary system and the critical region of the primary system.

Figure 14:
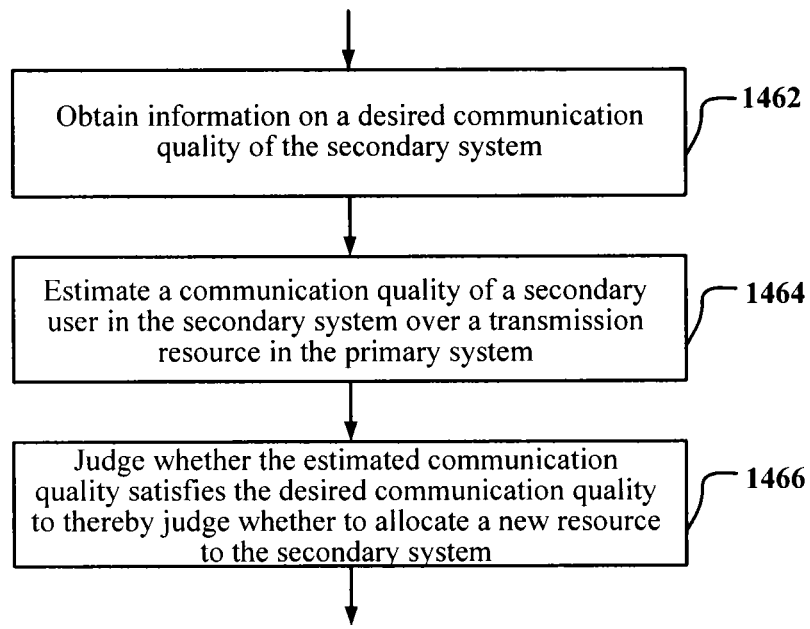
FIG. 14 is a schematic flow chart illustrating a method for managing wireless transmission resources according to another embodiment of this disclosure.

FIG. 14 illustrates a method for managing wireless transmission resources according to an embodiment. The method for managing wireless transmission resources can also be applicable to the wireless communication scenario including a primary system and a secondary system described above, where a resource is allocated using information on a desired communication quality of the secondary system.

As illustrated in FIG. 14, the method for managing wireless transmission resources can include steps 1462, 1464 and 1466.

In the step 1462, information on a desired communication quality of the secondary system is obtained. The information can be obtained, by an apparatus for allocating a wireless transmission resource in the secondary system, from a secondary base station and/or a secondary user of the secondary system. Alternatively the information can be pre-stored in the apparatus for allocating a wireless transmission resource of the secondary system (e.g., stored in a memory device therein (not illustrated)) and retrieved as needed for use. A detailed description thereof will be omitted here.

In the step 1464, a communication quality of a secondary user in the secondary system communicating over a transmission resource in the primary system is estimated. The communication quality can be estimated in the methods described above (e.g., the methods described with reference to FIG. 8 to FIG. 13 or Equations (1) to (8)) or any other appropriate method, and a repeated description thereof will be omitted here.

In the step 1466, it is judged whether the estimated communication quality satisfies the desired communication quality. In a particular example, if so, then the transmission resource is allocated to the secondary system (similar to the step 314); otherwise, the available transmission resource is not allocated to the secondary system (similar to the step 316).

With the method in FIG. 14, a waste of the transmission resource can be alleviated to thereby improve the use efficiency of the transmission resource.

In another particular example, if the assessed optimum communication quality is judged to exactly satisfy the desired communication quality of the secondary system, the available transmission resource is allocated to the secondary system; or if the assessed optimum communication quality is judged to be above the desired communication quality of the secondary system, the transmission resource allocated to the secondary system can be lowered instead of allocating the entire available transmission resource to the secondary system. If the assessed optimum communication quality is judged to be above the desired communication quality of the secondary system, then simply a part of the available transmission resource to satisfy the desired communication quality of the secondary system can be allocated to the secondary system. For example, if the desired communication quality of the secondary system is a signal to noise ratio of −5 dB, and the secondary user can have his or her application demand satisfied simply at transmission power of 15 dB, then if the secondary user is given a transmission resource at transmission power of 20 dB reaching a communication quality above 15 dB, then the transmission power allocated to the secondary system can be lowered, that is, simply a transmission power spectrum of 15 dB can be allocated thereto. With the method in this particular example, the available transmission resource can be further saved to thereby allocate the spared available transmission resource to another secondary system. Thus the use efficiency of the transmission resources can be further improved.

As can be appreciated, the method described reference to FIG. 14 can be used in combination with the methods described above with reference to FIG. 1 to FIG. 13, and a repeated description thereof will be omitted here.

Apparatuses for allocating wireless transmission resources according to some embodiments will be described below.

Figure 16:
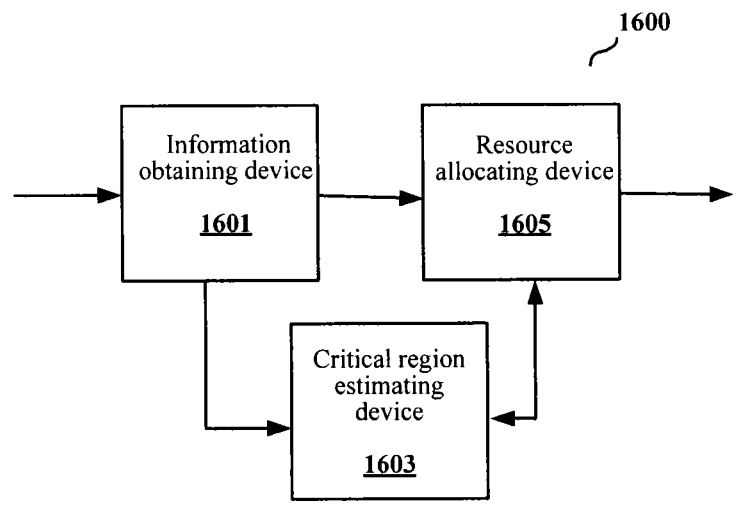
FIG. 16 is a schematic block diagram illustrating an apparatus for managing wireless transmission resources according to an embodiment of this disclosure.

FIG. 16 is a schematic block diagram illustrating an apparatus for allocating a wireless transmission resource according to an embodiment of this disclosure. The apparatus 1600 for allocating a wireless transmission resource illustrated in FIG. 16 can be arranged in a spectrum manager associated with a secondary system, a secondary base station in the secondary system, etc., as a part thereof.

As illustrated in FIG. 16, the apparatus for allocating a wireless transmission resource can include an information obtaining device 1601, a critical region estimating device 1603 and a resource allocating device 1606.

The apparatus 1600 for allocating a wireless transmission resource can perform the method for allocating a resource illustrated in FIG. 1. Particularly the information obtaining device 1601 can obtain resource information of a primary system. As described above, the resource information of the primary system includes information of an interference tolerance threshold reflecting a maximum interference power level tolerable to the primary system. Also as described above, the resource information of the primary system can further include other information on resource utilization of the primary system, for example, it can further include information on emission power of a primary base station in the primary system, a coverage area of the primary base station, a channel model of the primary system, etc.

The resource information of the primary system can be obtained from a primary base station of the primary system. Alternatively the information can be pre-stored in the apparatus 1600 for allocating a wireless transmission resource of the secondary system (e.g., stored in a memory device therein (not illustrated)), and the information obtaining device 1601 can read the information from the memory device when the information is needed for use, and a detailed description thereof will be omitted here.

The information obtaining device 1601 can further obtain resource information of a secondary system. As described above, the resource information of the secondary system can include information about resource utilization of the secondary system, for example, it can include information on emission power of a secondary base station in the secondary system, a channel model of the secondary system, a coverage area and a location of the secondary base station, etc.

The resource information of the secondary system can be obtained from a secondary base station and/or a secondary user of the secondary system. Alternatively the information can be pre-stored in the apparatus for allocating a wireless transmission resource of the secondary system (e.g., stored in the memory device therein (not illustrated)), and the information obtaining device 1601 can read the information from the memory device when the information is needed for use, and a detailed description thereof will be omitted here.

The information obtaining device 1601 provides the critical region estimating device 1603 and the resource allocating device 1605 with the obtained information.

The critical region estimating device 1603 can estimate a critical region possibly existing in a coverage area of the primary system (also referred to a critical region of the primary system) according to the resource information of the primary system and the resource information of the secondary system. As described above, the critical region of the primary system can include one or more regions with a lower communication quality (i.e., with a lower signal to noise ratio due to interference of the secondary system) in the coverage area of the primary system, for example, a region with a signal to noise ratio below a predetermined threshold (the threshold can be determined by a practical demand in a practical application and will not be limited here to a particular value).

The critical region estimating device 1603 can estimate signal to noise ratios in respective regions in the coverage area of the primary system using the resource information of the primary system and the resource information of the secondary system in any appropriate method to thereby determine the critical region of the primary system, for example, in any one of the examples of the methods described above with reference to FIG. 11 to 13, and a repeated description thereof will be omitted here.

The critical region estimating device 1603 can provide the resource allocating device 1605 with a result of estimation. The resource allocating device 1605 can determine an available transmission resource available to the secondary system among transmission resources of the primary system according to the critical region of the primary system and the interference tolerance threshold of a primary base station. As described above, the determined available transmission resource can include a wireless transmission resource (an available timeslot, an available frequency band and/or a maximum transmission bandwidth and emission power therein or the like) available to the secondary system.

The resource allocating device 1605 can determine the available transmission resource according to the critical region of the primary system and the interference tolerance threshold under such a criterion that interference caused by the secondary system during communicating over the available transmission resource to the primary system in the critical region of the primary system shall not exceed the interference tolerance threshold of the primary system. Particularly the resource allocating device 1605 can estimate interference caused by the secondary system during communicating over the transmission resources to the primary system in the critical region of the primary system and determine a transmission resource with an interference value which is not above the interference tolerance threshold of the primary system as the available transmission resource available to the secondary system. The resource allocating device 1605 can estimate interference caused by the secondary system during communicating over a transmission resource to the primary system in a region of the primary system in any appropriate method, and this disclosure will be not limited here in this respect, and a detailed description thereof will be omitted here.

In the apparatus for managing wireless transmission resources described above, the critical region in the coverage area of the primary system is estimated, and the available transmission resource available to the secondary system is determined using the critical region. Thus the transmission resource that can be allocated to the secondary system can be determined effectively while ensuring normal operation of the primary system.

In another embodiment, the apparatus 1600 for allocating a wireless transmission resource can further perform the method illustrated in FIG. 2. For example, the critical region estimating device 1603 can further estimate a critical region possibly existing in a coverage area of the secondary system (also referred to a critical region of the secondary system) according to the resource information of the primary system and the resource information of the secondary system. As described above, the critical region of the secondary system can include one or more regions with a lower communication quality (i.e., with a lower signal to noise ratio due to interference of the primary system) in the coverage area of the secondary system, for example, a region with a signal to noise ratio below a predetermined threshold (the threshold can be determined by a practical demand in a practical application and will not be limited here to a particular value). The critical region estimating device 1603 can estimate signal to noise ratios in respective regions in the coverage area of the secondary system using the resource information of the primary system and the resource information of the secondary system in any appropriate method to thereby determine the critical region of the secondary system, for example, in any one of the examples of the methods described above with reference to FIG. 8, FIG. 10 and FIG. 12, and a repeated description thereof will be omitted here. Moreover the resource allocating device 1605 can further assess an optimum communication quality available to the secondary system over the available transmission resource in the critical region of the secondary system and allocate the available transmission resource to the secondary system according to a result of assessing. Similarly to the foregoing description, a signal to noise ratio can be taken as a parameter reflecting a communication quality. Moreover a signal to noise ratio of the secondary system communicating over a transmission resource in the critical region of the secondary system can be estimated in any appropriate method, for example, in any one of the examples of the methods described above with reference to Equations (1) to (8), and a repeated description thereof will be omitted here.

In an example, the resource allocating device 1605 can judge whether the estimated optimum communication quality reaches a predetermined quality threshold (the threshold can be determined by a practical demand in a practical application and will not be limited here to a particular value), and if so, it will allocate the transmission resource to the secondary system; otherwise, it will not allocate the transmission resource to the secondary system.

In another example, the resource allocating device 1605 can further allocate a transmission resource to a secondary user based upon a desired communication quality of the secondary system in the method illustrated in FIG. 3. For example, the information obtaining device 1601 can further obtain information on the desired communication quality of the secondary system and provide the resource allocating device 1605 with the information. Then the resource allocating device 1605 judges whether the assessed optimum communication quality available to the secondary system over the available transmission resource in the critical region of the secondary system satisfies the desired communication quality of the secondary system. In a particular example, if the optimum communication quality is judged to satisfy the desired communication quality, the resource allocating device 1605 allocates the available transmission resource to the secondary system; otherwise, it will not allocate the available transmission resource to the secondary system. Thus a waste of the transmission resource can be alleviated to thereby improve the use efficiency of the transmission resource. In another particular example, if the assessed optimum communication quality is judged to exactly satisfy the desired communication quality of the secondary system, the resource allocating device 1605 can allocate the available transmission resource to the secondary system; or if the assessed optimum communication quality is judged to be above the desired communication quality of the secondary system, it can lower the transmission resource allocated to the secondary system instead of allocating the entire available transmission resource to the secondary system. Thus the available transmission resource can be further saved to thereby allocate the spared available transmission resource to another secondary system. Thus the use efficiency of the transmission resources can be further improved.

The apparatus 1600 for managing wireless transmission resources can further include a sending device (not illustrated) configured, after the available transmission resource among the transmission resources of the primary system is allocated to the secondary system, to send an allocation result to the secondary base station or the secondary user in the secondary system, or the sending device can send the allocation result to the secondary base station which further distributes the allocation result to the secondary user. Thus respective users can communicate over the allocated transmission resources.

Figure 17:
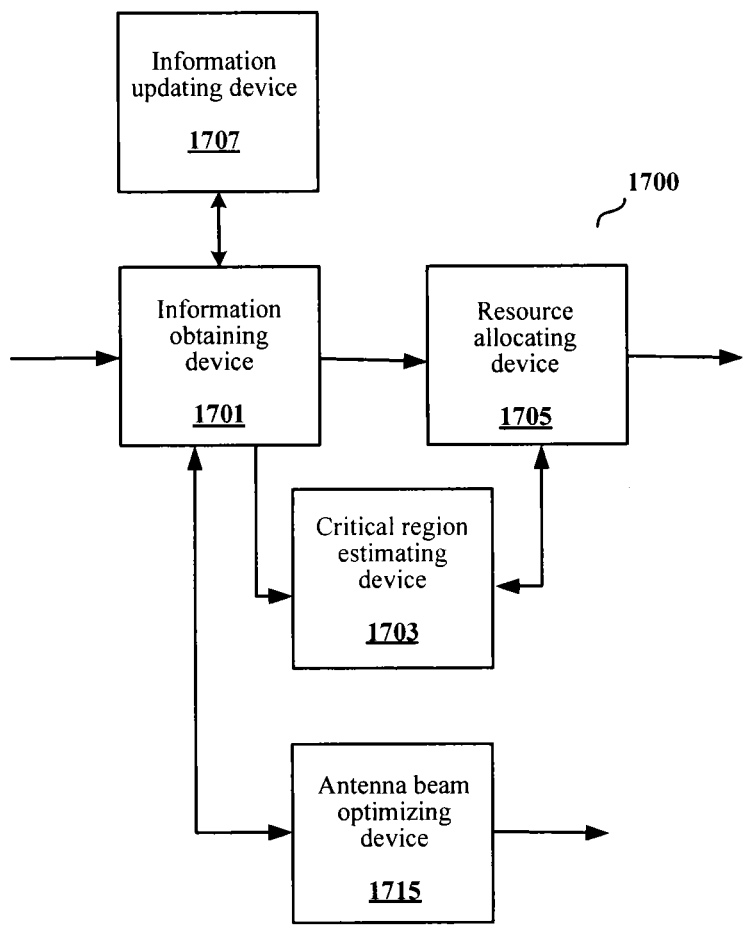
FIG. 17 is a schematic block diagram illustrating an apparatus for managing wireless transmission resources according to another embodiment of this disclosure.

FIG. 17 illustrates an apparatus 1700 for managing wireless transmission resources according to another embodiment of the invention.

A difference from the embodiment in FIG. 16 lies in that the apparatus 1700 for managing wireless transmission resources further includes an information updating device 1707 in addition to an information obtaining device 1701, a critical region estimating device 1703 and a resource allocating device 1705.

The information obtaining device 1701, the critical region estimating device 1703 and the resource allocating device 1705 have similar functions respectively to the information obtaining device 1601, the critical region estimating device 1603 and the resource allocating device 1605, and a repeated description thereof will be omitted here.

The apparatus 1700 for managing wireless transmission resources can monitor the use of a transmission resource in the method illustrated in FIG. 4. Particularly the information obtaining device 1701 can further obtain information on a communication quality in the critical region of the primary system and information on a communication condition in the critical region of the secondary system resulting from monitoring a communication condition of the primary user in the critical region of the primary system and a communication condition of the secondary user in the critical region of the secondary system. The information obtaining device 1701 can obtain the information in the methods described above, and a repeated description thereof will be omitted here. The information updating device 1707 can update the resource information of the primary system and/or the resource information of the secondary system, e.g., a channel model thereof, etc., according to a result of monitoring. The updated information can be saved in the apparatus for managing wireless transmission resources (e.g., the memory device thereof) for use in subsequent allocation of a transmission resource again. Optionally a communication condition of the primary user in a surrounding region of the critical region of the primary system and a communication condition of the primary user in a surrounding region of the critical region of the secondary system can be further monitored. The surrounding region as mentioned here refers to a region located around the critical region (a region located around the critical region can be selected dependent upon a practical application as the surrounding region, and this disclosure will be not limited here in this respect). The information obtaining device 1701 can further obtain information on a communication quality in the surrounding region of the critical region of the primary system and information on a communication condition in the surrounding region of the critical region of the secondary system resulting from monitoring a communication condition of the primary user in the surrounding region of the critical region of the primary system and a communication condition of the secondary user in the surrounding region of the critical region of the secondary system. The information updating device 1707 can update the resource information of the primary system and/or the resource information of the secondary system using the information. The surrounding regions of the estimated critical regions are monitored so that the system resource information can be updated and the information updating device 1707 can further revise the previously estimated critical regions to thereby make a subsequent resource allocation process more accurate and effective. For example, the information obtaining device 1701 and the information updating device 1707 can perform the method for updating a critical region illustrated in FIG. 20, and a repeated description thereof will be omitted here.

In the embodiment described above, the resource information of the primary system and/or the resource information of the secondary system is updated according to a change in system state in the communication system. Since the updated information reflects a real state of the system, subsequent resource allocation can be made more accurate and effective.

Figure 19:
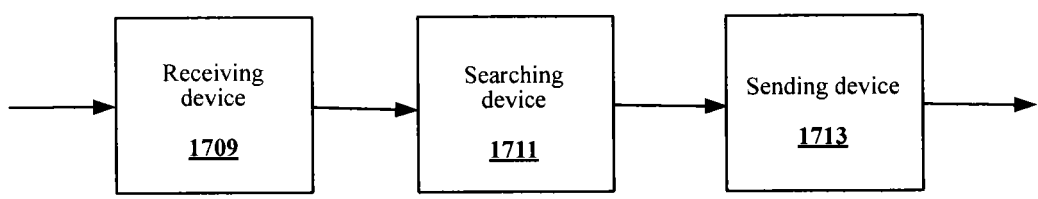
FIG. 19 is a schematic block diagram illustrating an additional structure of the apparatus for managing wireless transmission resources illustrated in FIG. 17.

Optionally as illustrated in FIG. 19, the apparatus 1700 for managing wireless transmission resources can further include a receiving device 1709, a searching device 1711 and a sending device 1713. The apparatus 1700 for managing wireless transmission resources can perform the handover process described above with reference to FIG. 5 or FIG. 6. In an example, the receiving device 1709 can receive a handover request of the primary user in the primary system who is located in the critical region of the primary system for a handover to the secondary system when the communication quality of the primary user in the critical region of the primary system is below a predetermined communication quality threshold. The searching device 1711 can search for a secondary base station with a coverage area covering the location of the primary user. The sending device 1713 can send the handover request to the searched secondary base station. In this example, the receiving device 1709 and the sending device 1713 can further perform the other reception and sending processes illustrated in FIG. 5, and a repeated description thereof will be omitted here. In another example, the receiving device 1709 can receive a handover request of the secondary user in the secondary system who is located in the critical region of the secondary system for a handover to the primary system when the communication quality of the secondary user in the critical region of the secondary system is below a predetermined communication quality threshold. The searching device 1711 can search for a primary base station with a coverage area covering the location of the secondary user. The sending device 1713 can send the handover request to the searched primary base station. In this example, the receiving device 1709 and the sending device 1713 can further perform the other reception and sending processes illustrated in FIG. 6, and a repeated description thereof will be omitted here.

It shall be appreciated that the apparatus 1700 for managing wireless transmission resources perform the handover processes of the primary and secondary users described above only in an application scenario in which communication mechanisms of the primary and secondary systems are mutually compatible, and a detailed description thereof will be omitted here.

In another embodiment, the apparatus 1700 for managing wireless transmission resources can further include an antenna beam optimizing device 1715 configured to optimize, select, etc., an antenna beam shape of a secondary base station. The antenna beam optimizing device 1715 can send a result of optimization or selection to the corresponding base station of the secondary system (for example, through the sending device 1713).

In an example, the antenna beam optimizing device 1715 is configured to optimize the antenna beam shape of a secondary base station according to the information on the communication quality in the critical region of the primary system and the information on the communication quality in the critical region of the secondary system resulting from monitoring the communication condition of the primary user in the critical region of the primary system and the communication condition of the secondary user in the critical region of the secondary system, and a repeated description thereof will be omitted here.

In another embodiment, the information obtaining device 1701 is further configured to obtain communication qualities of a primary user in the critical region of the primary system and communication qualities of a secondary user in the critical region of the secondary system under different antenna beam shapes of a secondary base station, and the antenna beam optimizing device 1715 is configured to select an antenna beam shape of the secondary base station according to the communication qualities in these two critical regions. For example, the antenna beam optimizing device 1715 can calculate the sums and/or the products of the communication qualities in the critical region of the primary system and the communication qualities in the critical region of the secondary system under the different antenna beam shapes of the secondary base station; and select the antenna beam shape corresponding to the highest value of the sum and or the product as the antenna beam shape of the secondary base station.

In another embodiment, the information obtaining device 1701 is further configured to obtain communication qualities in the critical region of the secondary system under different antenna beam shapes of a secondary base station, and the antenna beam optimizing device 1715 can select the antenna beam shape corresponding to the optimum communication quality as the antenna beam shape of the secondary base station.

The antenna beam optimizing device 1715 can optimize, select, etc., the antenna beam shape of the secondary base station in the respective methods described above, and a repeated description thereof will be omitted here.

As described above, in some embodiments, in the case that there are a plurality of secondary systems, these secondary systems can be clustered into a plurality of secondary system clusters. Each secondary system cluster can be treated as a whole. For example, the resource allocating device 1605 or 1705 can determine an available transmission resource to each secondary system cluster, and so on, and a repeated description thereof will be omitted here.

In some embodiments, a plurality of spectrum managers including a primary spectrum manager and one or more secondary spectrum managers can be arranged for the secondary systems. As described above, the primary spectrum manager manages one or more secondary user clusters and can receive information of the secondary user cluster(s) from the secondary spectrum managers. Each secondary spectrum manager can manage a single secondary system cluster and secondary users in the cluster. In this application scenario, the primary spectrum manager can perform centrally the methods in the respective embodiments or examples described above with reference to FIG. 1 to FIG. 7 and below with reference to FIG. 8 to FIG. 14 and can send various related process results (e.g., a result of allocating a transmission resource) to the secondary spectrum managers and receive information from the secondary spectrum managers (e.g., system resource information of the secondary systems and/or measurement results of the secondary systems on the critical regions of the secondary systems, etc.). In other words, the apparatus 1600 or 1700 for managing wireless transmission resources can be arranged at the side of the primary spectrum manager as a part of the primary spectrum manager. In the case that the respective secondary spectrum managers perform the methods in the respective embodiments or examples described above with reference to FIG. 1 to FIG. 5 and below with reference to FIG. 8 to FIG. 14 in a distributed management method, the apparatus 1600 or 1700 for managing wireless transmission resources can be arranged in each secondary spectrum manager as a part of each secondary spectrum manager.

Optionally the apparatus 1600 or 1700 for managing wireless transmission resources can further include a clustering device (not illustrated) configured to re-cluster the plurality of secondary systems according to a change in system information into new secondary system clusters. Thus a transmission resource can be allocated per new cluster of secondary systems to thereby utilize the transmission resources more effectively.

Figure 18:
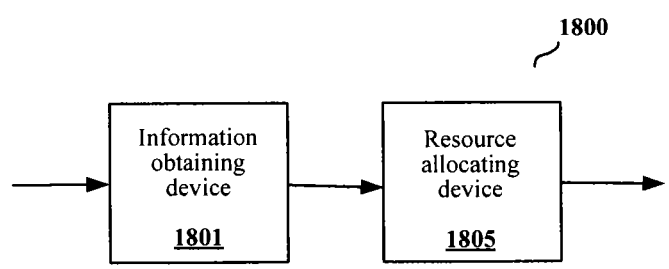
FIG. 18 is a schematic block diagram illustrating an apparatus for managing wireless transmission resources according to another embodiment of this disclosure.

FIG. 18 illustrates an apparatus for managing wireless transmission resources according to another embodiment. The apparatus 1800 managing wireless transmission resources can perform the method for managing wireless transmission resources described above with reference to FIG. 14. The apparatus 1800 managing wireless transmission resources can include an information obtaining device 1801 and a resource allocating device 1805.

The information obtaining device 1801 can obtain information on a desired communication quality of a secondary system. As described above, the information can be obtained from a secondary base station and/or a secondary user of the secondary system. Alternatively the information can be pre-stored in the apparatus for allocating a wireless transmission resource of the secondary system (e.g., stored in a memory device therein (not illustrated)) and retrieved as needed for use. A detailed description thereof will be omitted here.

The resource allocating device 1805 can estimate a communication quality of a secondary user in the secondary system communicating over a transmission resource in a primary system. The communication quality can be estimated in the methods described above (e.g., the methods described with reference to FIG. 8 to FIG. 13 or Equations (1) to (8)) or any other appropriate method, and a repeated description thereof will be omitted here. The resource allocating device 1805 can judge whether the estimated communication quality satisfies the desired communication quality. In a particular example, if so, the allocating device 1805 allocates the transmission resource to the secondary system; otherwise, the allocating device 1805 will not allocate the transmission resource to the secondary system. Thus a waste of the transmission resource can be alleviated to thereby improve the use efficiency of the transmission resource. In another particular example, if the assessed optimum communication quality is judged to exactly satisfy the desired communication quality of the secondary system, the resource allocating device 1805 can allocate the available transmission resource to the secondary system; or if the assessed optimum communication quality is judged to be above the desired communication quality of the secondary system, it can lower the transmission resource allocated to the secondary system instead of allocating the entire available transmission resource to the secondary system. With the apparatus in this particular example, the available transmission resource can be further saved to thereby allocate the spared available transmission resource to another secondary system. Thus the use efficiency of the transmission resources can be further improved.

Optionally the information obtaining device 1801 and the resource allocating device 1805 can further have similar functions respectively to the information obtaining device 1601 and the resource allocating device 1605, and a repeated description thereof will be omitted here.

Optionally the apparatus 1800 for managing wireless transmission resources can further include the other devices included in the apparatus 1600 or 1700 for managing wireless transmission resources, and a repeated description thereof will be omitted here.

Figure 21:
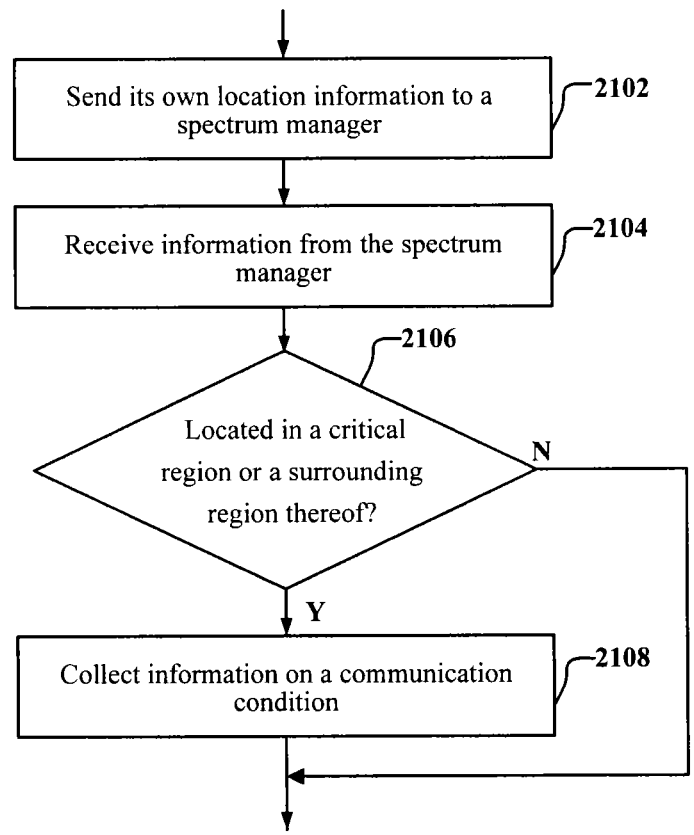
FIG. 21 is a schematic flow chart illustrating an example of a method for monitoring a critical region and a surrounding region thereof.

FIG. 21 illustrates an example of a method for monitoring a critical region by a system node (e.g., an SU or a PU or an SBS or a PBS) in a communication system. As illustrated in FIG. 21, in a step 2102, the system node sends its own location information to a related spectrum manager (a primary spectrum manager or a secondary spectrum manager of a cluster in which the node is located). Then in a step 2104, the system node receives information from the spectrum manager, where the information indicates whether the system node is located in a critical region (or whether it is located in a surrounding region of the critical region). Then in a step 2106, the system node judges from the received information whether it is located in a critical region (or a surround region thereof), and if so, the system node collects information on a communication condition while communicating (a step 2108). The information on a communication condition as mentioned here can include one or more of the following information: a user signal strength, user spectrum utilization information, variation statistical information of user signal power, etc. The system node can feed the collected information back to the spectrum manager. The spectrum manager can update system resource information and/or the critical region using the information as described above.

Figure 22:
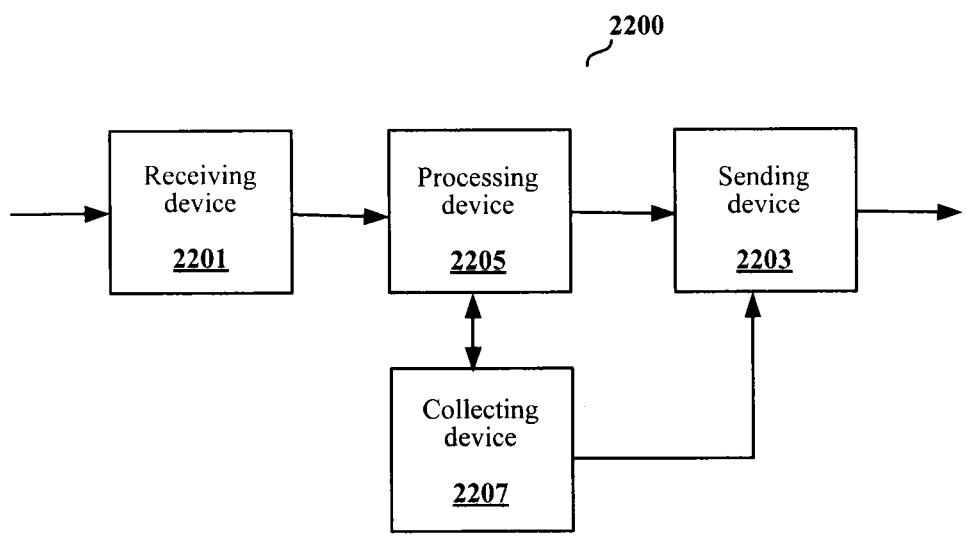
FIG. 22 is a schematic block diagram illustrating a communication apparatus performing the method illustrated in FIG. 21.

FIG. 22 provides a communication apparatus in this example. The communication apparatus 2200 can perform the method illustrated in FIG. 21. As illustrated in FIG. 22, the communication apparatus 2200 can include a receiving device 2201, a sending device 2203, a processing device 2205 and a collecting device 2207. The sending device 2203 can send location information of the communication apparatus to a related spectrum manager (a primary spectrum manager or a secondary spectrum manager of a cluster in which the node is located). The receiving device 2201 can receive information from the spectrum manager, where the information indicates whether the system node is located in a critical region (or whether it is located in a surrounding region of the critical region). The processing device 2205 can judge from the received information whether the communication apparatus is located in a critical region (or a surround region thereof), and if so, then the processing device 220 instructs the collecting device 2207 to collect information on a communication condition. The collecting device 2207 can send the collected information to the sending device 2203 so that the sending apparatus feeds the collected information back to the spectrum manager. The communication apparatus 2200 can be arranged in a user equipment of a primary user or a user equipment of a secondary user or a primary base station or a secondary base station as a part thereof.

Moreover it shall be appreciated that all the methods of and apparatuses for managing wireless transmission resources in the embodiments or examples described above are illustrative. In a practical application, these methods of and apparatuses for managing wireless transmission resources can further include steps, elements or components omitted above.

According to some embodiments of this disclosure, a wireless communication system including the apparatus for managing wireless transmission resources described above. The apparatus for managing wireless transmission resources can be arranged in a spectrum manager or a secondary base station as a part of the spectrum manager or the secondary base station.

It shall be appreciated that the embodiments and examples described above are illustrative but not exhaustive, and this disclosure shall not be construed as being limited to any particular embodiment or example. Moreover in the embodiments and examples described above, the steps of the methods or the modules of the apparatuses are denoted by reference numerals. Those ordinarily skilled in the art shall appreciate that these reference numerals are merely intended to distinguish these steps or modules literally but not to indicate an order or any other limitation thereof.

In an example, the respective steps in the methods described above and the respective constituent modules and/or devices in the apparatuses described above can be embodied as software, firmware, hardware or a combination thereof. The respective constituent components, units and sub-units in the apparatuses described above can be configured in software, hardware or a combination thereof. Particular available configuration means or modes are well known to those skilled in the art, and a repeated description thereof will be omitted here.

This disclosure further provides a program product with machine readable instruction codes stored thereon. The instruction codes can perform the methods for allocating a wireless transmission resource according to the embodiments of this disclosure upon be read and executed by a machine.

Correspondingly a storage medium carrying the program product with the machine readable instruction codes stored thereon is also encompassed in this disclosure. The storage medium includes but will not be limited to a floppy disk, an optical disk, a magnetic-optical disk, a memory card, a memory stick, etc.

In the foregoing description of the particular embodiments of this disclosure, a feature described and/or illustrated in connection with an implementation can be used identically or similarly in one or more other implementations in combined with or in place of a feature in the other implementation(s).

It shall be emphasized that the term "include/comprise" as used in the specification refers to the presence of a feature, an element, a step or a component but will not preclude the presence or addition of one or more other features, elements, steps or a components.

Moreover the methods of this disclosure may not be performed in the temporal order described in the specification but can alternatively be performed in another temporal order, concurrently or separately. For example, the steps 102 and 104 (or the steps 202 and 204) described above can be performed in a reversed order. Thus the order described in the specification in which the methods are performed will not limit the technical scope of this disclosure.

Embodiments with other configurations are also possible, as described in the following.

(1) A spectrum management system comprising: circuitry configured to obtain information of a primary communication system, the information including an interference tolerance of the primary communication system, obtain a desired communication quality for a secondary communication system, determine available resources for the secondary communication system that result in an interference level below the interference tolerance of the primary communication system, and allocate resources to the secondary communication system based on a comparison of an estimated communication quality of the secondary communication system if the available resources are used and the desired communication quality.

(2) The spectrum management system of (1), wherein if the estimated communication quality of the secondary communication system is above the desired communication quality, the circuitry allocates a subset of the available resources to the secondary communication system.

(3) The spectrum management system of (2) according to claim 2, wherein the subset of the available resources that is allocated to the secondary communication system satisfies the desired communication quality.

(4) The spectrum management system of any one of (1) to (3), wherein the circuitry does not allocate resources to the secondary communication system when the estimated communication quality is below the desired communication quality.

(5) The spectrum management system of any one of (1) to (4), wherein the circuitry is further configured to provide an indication that the estimated communication quality is below the desired communication quality.

(6) The spectrum management system of (5), wherein the indication includes reconfiguration instructions to reconfigure the secondary communication system.

(7) The spectrum management system of (6), wherein the reconfiguration instructions include instructions to reconfigure an antenna beam pattern of the secondary communication system.

(8) The spectrum management system of any one of (6) to (7), wherein the reconfiguration instructions include instructions to instruct re-clustering of secondary communication systems, including the secondary communication system, and the circuitry allocates resources to each cluster of secondary communication systems.

(9) The spectrum management system of any one of (1) to (8), wherein the interference level is determined in a critical region of the primary communication system, and the circuitry is further configured to identify the critical region of the primary communication system based on an estimated signal-to-noise ratio (SNR) of the primary communication system.

(10) The spectrum management system of (9), wherein the critical region is identified as a region where the estimated SNR of the primary communication system is below a predetermined threshold.

(11) The spectrum management system of any one of (9) to (10), wherein the estimated SNR is based on a channel model and transmit power of the primary communication system and the secondary communication system.

(12) The spectrum management system of any one of (9) to (11), wherein the circuitry allocates resources to the secondary communication system when the interference level in the critical region is below a predetermined threshold.

(13) The spectrum management system of any one of (9) to (12), wherein the circuitry monitors an area about the critical region of the primary communication system and updates the critical region accordingly.

(14) The spectrum management system of any one of (1) to (14), wherein the primary communication system is a television band system and the secondary communication system is a system that is not licensed for television band use.

(15) The spectrum management system of any one of (1) to (14), wherein the available resources include at least one of available timeslots, available frequency band, maximum transmission bandwidth and maximum transmission power.

(16) The spectrum management system of (13), wherein the circuitry is further configured to cause a handover of a user of the primary communication system to the secondary communication system upon determination that communication quality of the primary communication system falls below a predetermined threshold in the critical region.

(17) The spectrum management system of (16), wherein the circuitry is further configured to cause a handover of a user of the secondary communication system to the primary communication system when a communication quality of the secondary communication system in a critical region thereof falls below a predetermined threshold.

(18) The spectrum management system of any one of (1) to (17), wherein the circuitry is further configured to obtain information of another secondary communication system, the information including an interference tolerance of the other secondary communication system, and the interference level in a critical region of the other secondary communication system is below the interference tolerance of the other secondary communication system.

(19) A spectrum management method, comprising: obtaining, with circuitry, information of a primary communication system, the information including an interference tolerance of the primary communication system; obtaining, with the circuitry, a desired communication quality for a secondary communication system; determining, with the circuitry, available resources for the secondary communication system that result in an interference level below the interference tolerance of the primary communication system; and allocating, with the circuitry, resources to the secondary communication system based on a comparison of an estimated communication quality of the secondary communication system if the available resources are used and the desired communication quality.

(20) A non-transitory computer-readable medium encoded with computer-readable instructions thereon, the computer-readable instructions when executed by a computer cause the computer to perform a method comprising: obtaining information of a primary communication system, the information including an interference tolerance of the primary communication system; obtaining a desired communication quality for a secondary communication system; determining available resources for the secondary communication system that result in an interference level below the interference tolerance of the primary communication system; and allocating resources to the secondary communication system based on a comparison of an estimated communication quality of the secondary communication system if the available resources are used and the desired communication quality.

(21) An apparatus for managing wireless transmission resources, wherein the apparatus is applicable to a wireless communication scenario comprising a primary system and a secondary system and comprises: an information obtaining device configured to obtain resource information of the primary system and resource information of the secondary system, wherein the resource information of the primary system comprises information of an interference tolerance threshold reflecting a maximum interference power level tolerable to the primary system; a critical region estimating device configured to estimate a critical region of the primary system according to the resource information of the primary system and the resource information of the secondary system, wherein the critical region of the primary system comprises such a region in a coverage area of the primary system that has a low signal to noise ratio due to interference of the secondary system; and a resource allocating device configured to determine an available transmission resource available to the secondary system among transmission resources of the primary system according to the critical region of the primary system and the interference tolerance threshold.

(22) The apparatus for managing wireless transmission resources of (21), wherein the resource allocating device is further configured to estimate interference caused by the secondary system during communicating over the transmission resources to the primary system in the critical region of the primary system and to determine a transmission resource with an interference value which is not above the interference tolerance threshold of the primary system as the available transmission resource available to the secondary system.

(23) The apparatus for managing wireless transmission resources of any one of (11) and (22), wherein: the information obtaining device is further configured to obtain information on a desired communication quality of the secondary system; the critical region estimating device is further configured to estimate a critical region of the secondary system according to the resource information of the primary system and the resource information of the secondary system, wherein the critical region of the secondary system comprises such a region in a coverage area of the secondary system that has a low signal to noise ratio due to interference of the primary system; and the resource allocating device is further configured to assess an optimum communication quality achievable to the secondary system over the available transmission resource in the critical region of the secondary system, to judge whether the assessed optimum communication quality satisfies the desired communication quality of the secondary system, and if not so, not to allocate the available transmission resource to the secondary system.

(24) The apparatus for managing wireless transmission resources of (23), wherein the resource allocating device is further configured to judge whether the assessed optimum communication quality is above the desired communication quality of the secondary system. and if so, to lower the transmission resource allocated to the secondary system.

(25) The apparatus for managing wireless transmission resources of any one of (23) to (24), wherein the resource allocating device is further configured to reconfigure the secondary system upon judging that the assessed optimum communication quality fails to satisfy another communication quality of the secondary system.

(26) The apparatus for managing wireless transmission resources of any one of (23) to (25), wherein: the information obtaining device is further configured to obtain a communication quality of a primary user in the critical region of the primary system and a communication quality of a secondary user in the critical region of the secondary system by monitoring the critical region of the primary system and the critical region of the secondary system, and the apparatus further comprises: an information updating device configured to update the resource information of the primary system and/or the resource information of the secondary system according to a result of the monitoring.

(27) The apparatus for managing wireless transmission resources of (26), wherein the information obtaining device is further configured to obtain a communication quality of the primary user in a surrounding region of the critical region of the primary system and a communication quality of the secondary user in a surrounding region of the critical region of the secondary system by monitoring the surrounding region of the critical region of the primary system and the surrounding region of the critical region of the secondary system.

(28) The apparatus for managing wireless transmission resources of any one of (26) to (27), further comprising: a receiving device configured to receive a handover request of the primary user in the primary system who is located in the critical region of the primary system for a handover to the secondary system when the communication quality of the primary user in the critical region of the primary system is below a predetermined communication quality threshold; a searching device configured to search for a secondary base station with a coverage area covering the location of the primary user; and a sending device configured to send the handover request to the searched secondary base station.

(29) The apparatus for managing wireless transmission resources of any one of (26) to (28), further comprising: a receiving device configured to receive a handover request of the secondary user in the secondary system who is located in the critical region of the secondary system for a handover to the primary system when the communication quality of the secondary user in the critical region of the secondary system is below a predetermined communication quality threshold; a searching device configured to search for a primary base station with a coverage area covering the location of the secondary user; and a sending device configured to send the handover request to the searched primary base station.

(30) The apparatus for managing wireless transmission resources of any one of (26) to (29), further comprising: an antenna beam optimizing device configured to optimize an antenna beam shape of a secondary base station according to the result of the monitoring.

(31) The apparatus for managing wireless transmission resources of any one of (23) to (25), wherein the information obtaining device is further configured to obtain communication qualities of a primary user in the critical region of the primary system and communication qualities of a secondary user in the critical region of the secondary system under different antenna beam shapes of a secondary base station, and the apparatus further comprises: an antenna beam optimizing device configured to select an antenna beam shape of the secondary base station according to the communication qualities in these two critical regions.

(32) The apparatus for managing wireless transmission resources of (31), wherein the antenna beam optimizing device is configured to select an antenna beam shape of the secondary base station by: calculating the sums and/or the products of the communication qualities in the critical region of the primary system and the communication qualities in the critical region of the secondary system under the different antenna beam shapes of the secondary base station; and selecting the antenna beam shape corresponding to the highest value of the sum or the product as the antenna beam shape of the secondary base station.

(33) The apparatus for managing wireless transmission resources of any one of (23) to (25), wherein the critical region estimating device is configured to estimate the critical region of the secondary system by: calculating a transmission path gain of a primary base station to a location in the coverage area of the secondary system according to a channel model of the primary system; calculating a transmission path gain of a secondary base station to the location according to a channel model of the secondary system; estimating a signal to noise ratio of the location according to these two transmission paths gains; and determining the critical region of the secondary system according to the signal to noise ratios at respective locations in the coverage area of the secondary system.

(34) The apparatus for managing wireless transmission resources of any one of (23) to (25), wherein the critical region estimating device is configured to estimate the critical region of the secondary system by: obtaining an instantaneous path fading gain of a primary base station to a location in the coverage area of the secondary system and an instantaneous path fading gain of a secondary base station to the location in the coverage area of the secondary system; estimating an outage rate at the location according to these two instantaneous path fading gains; and determining the critical region of the secondary system according to the outage rates at respective locations in the coverage area of the secondary system.

(35) The apparatus for managing wireless transmission resources of any one of (23) to (25), wherein the critical region estimating device is configured to estimate the critical region of the secondary system by: calculating an instantaneous channel capacity at a location subject to interference of the primary system in the coverage area of the secondary system according to emission power of a secondary base station; estimating an outage channel capacity at the location according to the instantaneous channel capacity; and determining the critical region of the secondary system according to the outage channel capacities at respective locations in the coverage area of the secondary system.

(36) The apparatus for managing wireless transmission resources of any one of (21) to (25), wherein the critical region estimating device is configured to estimate the critical region of the primary system by: calculating a transmission path gain of a primary base station to a location in the coverage area of the primary system according to a channel model of the primary system; calculating a transmission path gain of a secondary base station to the location in the coverage area of the primary system according to a channel model of the secondary system; estimating a signal to noise ratio of the location according to these two transmission paths gains; and determining the critical region of the primary system according to the signal to noise ratios at respective locations in the coverage area of the primary system.

(37) The apparatus for managing wireless transmission resources of any one of (21) to (25), wherein the critical region estimating device is configured to estimate the critical region of the primary system by: obtaining an instantaneous path fading gain of a primary base station to a location in the coverage area of the primary system and an instantaneous path fading gain of a secondary base station to the location in the coverage area of the primary system; estimating an outage rate at the location according to these two instantaneous path fading gains; and determining the critical region of the primary system according to the outage rates at respective locations in the coverage area of the primary system.

(38) The apparatus for managing wireless transmission resources of any one of (21) to (25), wherein the critical region estimating device is configured to estimate the critical region of the primary system by: calculating an instantaneous channel capacity at a location subject to interference of the secondary system in the coverage area of the primary system according to emission power of a primary base station; estimating an outage channel capacity at the location according to the instantaneous channel capacity; and determining the critical region of the primary system according to the outage channel capacities at the respective locations in the coverage area of the primary system.

(39) The apparatus for managing wireless transmission resources of any one of (21) to (25), wherein the secondary system is clustered into a plurality of secondary system clusters, and wherein the resource allocating device is configured to determine an available transmission resource available to each secondary system cluster among the transmission resources of the primary system.

(40) The apparatus for managing wireless transmission resources of (19), further comprising: a clustering device configured to re-cluster the secondary system according to a change in system information.

(41) An apparatus for managing wireless transmission resources, wherein the apparatus is applicable to a wireless communication scenario comprising a primary system and a secondary system and comprises: an information obtaining device configured to obtain information on a desired communication quality of the secondary system; and a resource allocating device configured to allocate the transmission resources of the primary system to the secondary system according to the desired communication quality.

(42) The apparatus for managing wireless transmission resources of (41), wherein the resource allocating device is configured to estimate a communication quality of a secondary user in the secondary system over a transmission resource in the primary system, to judge whether the estimated communication quality satisfies the desired communication quality, and allocate the transmission resource of the primary system to the secondary system according to the judging result.

(43) The apparatus for managing wireless transmission resources of (42), wherein, if the estimated communication quality satisfies the desired communication quality, the resource allocating device allocates the transmission resource of the primary system to the secondary system.

(44) The apparatus for managing wireless transmission resources of any one of (42) to (43), wherein the resource allocating device is further configured to lower the transmission resource allocated to the secondary system or emission power of the secondary system over the transmission resource when the estimated communication quality is above the desired communication quality.

(45) The apparatus for managing wireless transmission resources of any one of (22) to (24), wherein, the resource allocating device allocates only part of the transmission resources that satisfies the desired communication quality of the secondary system to the secondary system.

(46) The apparatus for managing wireless transmission resources of (42), wherein, if the estimated communication quality is lower than the desired communication quality, the resource allocating device is configured to not to allocate the transmission resource to the secondary system.

(47) The apparatus for managing wireless transmission resources of (42), wherein, if the estimated communication quality is lower than the desired communication quality, the resource allocating device is configured to send an instruction to the secondary system.

(48) The apparatus for managing wireless transmission resources of (47), wherein, the instruction includes information of reconfiguration of the secondary system.

(49) The apparatus for managing wireless transmission resources of any one of (41) to (48), wherein, further comprises transmitting device configured to transmit information related to allocation of transmission resources to the secondary system.

(50) A secondary system apparatus, configured to provide information related to a desired communication quality to the apparatus for managing wireless transmission resources of any one of (41) to (49) and receive information related to allocation of transmission resources from the apparatus for managing wireless transmission resources.

(51) The secondary system apparatus of (50), wherein, the information related to transmission resource allocation is determined according to whether an estimated communication quality of the transmission resource of primary system if used by the secondary system can satisfy the desired communication quality.

(52) The secondary system apparatus of any one of (50) to (51), wherein, when the estimated communication quality satisfies the desired communication quality, the information related to transmission resource allocation comprises transmission resource of the primary system allocated to the secondary system apparatus.

(53) The secondary system apparatus of (52), wherein, when the estimated communication quality is higher than the desired communication quality, transmission resource of the primary system allocated to the secondary system apparatus is only part of the transmission resources that satisfies the desired communication quality of the secondary system apparatus.

(54) The secondary system apparatus of any one of (52) to (53), wherein, if the estimated communication quality is lower than the desired communication quality, the information related to transmission resource allocation comprises an instruction to the secondary system apparatus.

(55) The secondary system apparatus of (54), wherein, the instruction includes information of reconfiguration of the secondary system apparatus.

(56) A managing method of secondary system apparatus, comprising: providing information related to a desired communication quality to the apparatus for managing wireless transmission resources according to claim 21; and receiving information related to allocation of transmission resources from the apparatus for managing wireless transmission resources.

(57) The managing method of secondary system apparatus of (56), wherein, the information related to transmission resource allocation is determined according to whether an estimated communication quality of the transmission resource of primary system if used by the secondary system can satisfy the desired communication quality.

(58) The managing method of secondary system apparatus of (57), wherein, when the estimated communication quality satisfies the desired communication quality, the information related to transmission resource allocation comprises transmission resource of the primary system allocated to the secondary system apparatus.

(59) The managing method of secondary system apparatus of (58), wherein, when the estimated communication quality is higher than the desired communication quality, transmission resource of the primary system allocated to the secondary system apparatus is only part of the transmission resources that satisfies the desired communication quality of the secondary system apparatus.

(60) The managing method of secondary system apparatus of any one of (58) to (59) according to claim 38, wherein, if the estimated communication quality is lower than the desired communication quality, the information related to transmission resource allocation comprises an instruction to the secondary system apparatus.

(61) The managing method of secondary system apparatus of (60), wherein, the instruction includes information of reconfiguration of the secondary system apparatus.

(62) A method for managing wireless transmission resources, wherein the method is applicable to a wireless communication scenario comprising a primary system and a secondary system and comprises: obtaining resource information of the primary system, which comprises information of an interference tolerance threshold reflecting a maximum interference power level tolerable to the primary system; obtaining resource information of the secondary system; estimating a critical region of the primary system according to the resource information of the primary system and the resource information of the secondary system, wherein the critical region of the primary system comprises such a region in a coverage area of the primary system that has a low signal to noise ratio due to interference of the secondary system; and determining an available transmission resource available to the secondary system among transmission resources of the primary system according to the critical region of the primary system and the interference tolerance threshold.

(63) A method for managing wireless transmission resources, wherein the method is applicable to a wireless communication scenario comprising a primary system and a secondary system and comprises: obtaining information on a desired communication quality of the secondary system; and allocating the transmission resources of the primary system to the secondary system according to the desired communication quality.

(64) The method for managing wireless transmission resources of (63), further comprises: estimating a communication quality of a secondary user in the secondary system over a transmission resource in the primary system; and judging whether the estimated communication quality satisfies the desired communication quality, and allocating the transmission resource of the primary system to the secondary system according to the judging result.

(65) The method for managing wireless transmission resources of (64), if the estimated communication quality satisfies the desired communication quality, allocating the transmission resource of the primary system to the secondary system.

(66) The method for managing wireless transmission resources of any one of (64) to (65), wherein the transmission resource allocated to the secondary system or emission power of the secondary system over the transmission resource is lowered when the estimated communication quality is above the desired communication quality.

(67) The method for managing wireless transmission resources of (66), allocating only part of the transmission resources that satisfies the desired communication quality of the secondary system to the secondary system.

(68) The method for managing wireless transmission resources of any one of (64) to (66), if the estimated communication quality is lower than the desired communication quality, not allocating the transmission resource to the secondary system.

(69) The method for managing wireless transmission resources of any one of (64) to (68), if the estimated communication quality is lower than the desired communication quality, sending an instruction to the secondary system.

(70) The method for managing wireless transmission resources of (69), wherein, the instruction includes information of reconfiguration of the secondary system.
(71) The method for managing wireless transmission resources of (63), further comprises transmitting information related to allocation of transmission resources to the secondary system.

Although the foregoing description illustrates the particular embodiments of this disclosure, it shall be noted that those skilled in the art can make various modifications, adaptations or equivalents to this disclosure without departing from the spirit and scope of the appended claims. These modifications, adaptations or equivalents shall also be construed as falling into the protection scope of this disclosure

What is claimed is:

1. A spectrum management system comprising: circuitry configured to
   obtain previously stored information of a primary communication system, the previously stored information including an interference tolerance of the primary communication system, the interference tolerance reflecting a maximum interference power level tolerable to the primary communication system,
   obtain a desired communication quality for a secondary communication system,
   determine available resources, among resources accessible to the primary communication system and not in use by the primary communication system, for the secondary communication system that result in an interference level below the interference tolerance of the primary communication system, the interference level being a level of an interference from the secondary communication system to the primary communication system, such that the interference level is below the maximum interference power level tolerable to the primary communication system,
   estimate a communication quality of the secondary communication system assuming the determined available resources are used,
   compare the estimated communication quality with the obtained desired communication quality to obtain a comparison result,
   and allocate at least a portion of the available resources that is sufficient to satisfy the obtained desired communication qualify to the secondary communication system
   when the obtained comparison result indicates that the estimated communication
   quality is above the obtained desired communication quality,
   wherein the spectrum management system is different from the primary communication system and the secondary communication system.

2. The spectrum management system according to claim 1, wherein the circuitry is configured to allocate less than an entirety of the available resources to the secondary communication system when the obtained comparison result indicates that the estimated communication quality of the secondary communication system is above the desired communication quality.

3. The spectrum management system according to claim 1, wherein the circuitry is configured to allocate none of the available resources to the secondary communication system when the obtained comparison result indicates that the estimated communication quality is below the desired communication quality.

4. The spectrum management system according to claim 1, wherein the circuitry is further configured to provide an indication that the estimated communication quality is below the desired communication quality when the obtained comparison result indicates that the estimated communication quality is below the desired communication quality.

5. The spectrum management system according to claim 4, wherein the indication includes reconfiguration instructions to reconfigure the secondary communication system.

6. The spectrum management system according to claim 5, wherein the reconfiguration instructions include instructions to reconfigure an antenna beam pattern of the secondary communication system.

7. The spectrum management system according to claim 5, wherein the reconfiguration instructions include instructions to instruct re-clustering of secondary communication systems, including the secondary communication system, and the circuitry is configured to allocate the available resources to each cluster of secondary communication systems.

8. The spectrum management system according to claim 1, wherein the interference level is determined in a critical region of the primary communication system, and the circuitry is further configured to identify the critical region of the primary communication system based on an estimated signal-to-noise ratio (SNR) of the primary communication system.

9. The spectrum management system according to claim 8, wherein the critical region is identified as a region where the estimated SNR of the primary communication system is below a predetermined threshold.

10. The spectrum management system according to claim 8, wherein the estimated SNR is based on a channel model and transmit power of the primary communication system and the secondary communication system.

11. The spectrum management system according to claim 8, wherein the circuitry is configured to allocate the available resources to the secondary communication system when the interference level in the critical region is below' a predetermined threshold.

12. The spectrum management system according to claim 8, wherein the circuitry is configured to monitor an area about the critical region of the primary communication system and to update the critical region accordingly.

13. The spectrum management system according to claim 12, wherein the circuitry is further configured to cause a handover of a user of the primary communication system to the secondary communication system upon determination that communication qualify of the primary communication system falls below a predetermined threshold in the critical region.

14. The spectrum management system according to claim 12, wherein the circuitry is further configured to cause a handover of a user of the secondary communication system to the primary communication system when a communication quality of the secondary communication system in the critical region thereof falls below a predetermined threshold.

15. The spectrum management system according to claim 1, wherein the primary communication system is a television band system and the secondary communication system is a system that is not licensed for television band use.

16. The spectrum management system according to claim 1, wherein the available resources include at least one of available timeslots, available frequency band, maximum transmission bandwidth and maximum transmission power.

17. The spectrum management system according to claim 1, wherein the circuitry is further configured to obtain information of another secondary communication system, the information including an interference tolerance of the other secondary communication system, and allocate the available resources such that another interference level in a critical region of the other secondary communication system is below the interference tolerance of the other secondary communication system.

18. The spectrum management system according to claim 1, wherein the primary communication system is a system to which a spectrum is accessible, and the secondary communication system is a system without an accessible spectrum, which can access the spectrum accessible to the primary communication system only when the spectrum is not in use by the primary communication system.

19. The spectrum management system according to claim 1, wherein the primary communication system and the secondary communication system are systems to which a spectrum is accessible but with different access priorities to the spectrum.

20. The spectrum management system according to claim 1, wherein the circuitry is configured to:
estimate the communication quality of the secondary communication system assuming the determined available resources are used respectively under different antenna beam shapes of the secondary communication system;
and select an antenna beam shape of the secondary communication system from among the different antenna beam shapes based on the estimated communication quality.

21. The spectrum management system according to claim 1, wherein the desired communication quality is obtained from a base station or a user of the secondary communication system.

22. The spectrum management system according to claim 1, wherein the desired communication quality is pre-stored in a memory of the spectrum management system.

23. A spectrum management method performed by a spectrum management system, the method comprising:
obtaining, by circuitry of the spectrum management system, previously stored information of a primary communication system, the previously stored information including an interference tolerance of the primary communication system, the interference tolerance reflecting a maximum interference power level tolerable to the primary communication system:
obtaining, by the circuitry, a desired communication quality for a secondary communication system;
determining, by the circuitry among resources accessible to the primary communication system and not in use by the primary communication system, available resources for the secondary communication system that result in an interference level below the interference tolerance of the primary communication system, the interference level being a level of an interference from the secondary communication system to the primary communication system, such that the interference level is below the maximum, interference power level tolerable to the primary communication system;
estimating, by the circuitry, a communication quality of the secondary communication system assuming the determined available resources are used;
comparing, by the circuitry, the estimated communication quality with the obtained desired communication quality to obtain a comparison result;
and allocating, by the circuitry, at least a portion of the available resources that is sufficient to satisfy the obtained desired communication quality to the secondary communication system when the obtained comparison result indicates that the estimated communication quality is above the obtained desired communication qualify, wherein the spectrum management system is different from the primary communication system and the secondary communication system.

24. The spectrum management method according to claim 23, further comprising:
allocating none of the available resources to the secondary communication system when the obtained comparison result indicates that the estimated communication quality is below the desired communication quality.

25. A non-transitory computer-readable medium encoded with computer-readable instructions thereon, the computer-readable instructions when executed by processing circuitry of a spectrum management system cause the spectrum management system to perform a method, the method comprising:
obtaining previously stored information of a primary communication system, the previously stored information including an interference tolerance of the primary communication system, the interference tolerance reflecting a maximum interference power level tolerable to the primary communication system;
obtaining a desired communication quality for a secondary communication system; determining available resources, among resources accessible to the primary communication system and not in use by the primary communication system, for the secondary communication system that result in an interference level below the interference tolerance of the primary communication system, the interference level being a level of an interference from the secondary communication system to the primary communication system, such that the interference level is below the maximum interference power level tolerable to the primary communication system;
estimating a communication quality of the secondary communication system assuming the determined available resources are used;
comparing the estimated communication quality with the obtained desired communication quality to obtain a comparison result;
and allocating at least a portion of the available resources that is sufficient to satisfy the obtained desired communication quality to the secondary communication system when the obtained comparison result indicates that the estimated communication quality is above the obtained desired communication quality,
wherein the spectrum management system is different from the primary communication system and the secondary communication system.

26. The non-transitory computer-readable medium according to claim 25, wherein the method further comprises:
allocating none of the available resources to the secondary communication system when the obtained comparison result indicates that the estimated communication quality is below the desired communication quality.

* * * * *